(12) United States Patent
Reinhold et al.

(10) Patent No.: US 11,238,264 B2
(45) Date of Patent: Feb. 1, 2022

(54) APPARATUS FOR THE DIRECT OPTICAL CAPTURE OF SKIN PRINTS AND DOCUMENTS

(71) Applicant: JENETRIC GmbH, Jena (DE)

(72) Inventors: Joerg Reinhold, Jena (DE); Juergen Hillmann, Jena (DE); Undine Richter, Jena (DE); Philipp Riehl, Jena (DE); Dirk Morgeneier, Jena (DE)

(73) Assignee: JENETRIC GMBH, Jena (DE)

( * ) Notice: Subject to any disclaimer, the term of this patent is extended or adjusted under 35 U.S.C. 154(b) by 0 days.

(21) Appl. No.: 16/938,860

(22) Filed: Jul. 24, 2020

(65) Prior Publication Data

US 2021/0004556 A1   Jan. 7, 2021

Related U.S. Application Data

(63) Continuation of application No. PCT/DE2019/100073, filed on Jan. 24, 2019.

(30) Foreign Application Priority Data

Jan. 25, 2018 (DE) ..................... 10 2018 101 625.5

(51) Int. Cl.
  *G06K 9/00* (2006.01)
(52) U.S. Cl.
  CPC ......... *G06K 9/0004* (2013.01); *G06K 9/0008* (2013.01); *G06K 9/00046* (2013.01)
(58) Field of Classification Search
  CPC .................................................. G06K 9/0004
  See application file for complete search history.

(56) References Cited

U.S. PATENT DOCUMENTS

| 2016/0224819 A1 | 8/2016 | Kim et al. |
| 2017/0017824 A1 | 1/2017 | Smith et al. |

(Continued)

FOREIGN PATENT DOCUMENTS

| WO | 2017/045130 A1 | 3/2017 |
| WO | 2017/063119 A1 | 4/2017 |
| WO | 2018/004243 A1 | 1/2018 |

OTHER PUBLICATIONS

International Search Report from PCT/DE2019/100073, filed Jan. 24, 2019, dated Apr. 24, 2019.

*Primary Examiner* — Joseph R Haley
(74) *Attorney, Agent, or Firm* — Patentbar International, P.C.

(57) ABSTRACT

An apparatus for direct optical capture of security-relevant objects such as at least skin prints and documents produces a contrast between skin ridges and skin valleys in direct optical sensors for capturing skin prints in the range of contrast of conventional systems with frustrated total internal reflection. A contrast enhancing layer is provided with one contrast shield associated with each light-sensitive element of the sensor layer. The associated contrast shield is arranged at a distance above the light-sensitive element and has a surface area at least as large as an active region of the light-sensitive element). The contrast shield is arranged at a distance above the light-sensitive element such that at least 60% of the active region is covered. The illumination layer has a plurality of point light sources which emit in direction of the placement surface in an angular area limited for preventing total internal reflection.

18 Claims, 8 Drawing Sheets

(56) References Cited

U.S. PATENT DOCUMENTS

| | | |
|---|---|---|
| 2017/0161540 A1 | 6/2017 | Mienko et al. |
| 2017/0161543 A1 | 6/2017 | Smith et al. |
| 2017/0161544 A1 | 6/2017 | Fomani et al. |
| 2017/0169273 A1 | 6/2017 | Wu |
| 2017/0337413 A1* | 11/2017 | Bhat .................. G06K 9/00087 |
| 2017/0372113 A1 | 12/2017 | Zhang et al. |
| 2019/0228204 A1* | 7/2019 | Park ........................ G09G 3/22 |
| 2019/0229141 A1* | 7/2019 | Kim .................... H01L 27/1464 |

* cited by examiner ated Application of International Application PCT/DE2019/100073, filed on Jan. 24, 2019, which in turn claims priority to German Patent Application DE 10 2018 101 625.5, filed Jan. 25, 2018, both of which are incorporated herein by reference in their entirety.

APPARATUS FOR THE DIRECT OPTICAL CAPTURE OF SKIN PRINTS AND DOCUMENTS

RELATED APPLICATIONS

This Application is a Continuation Application of International Application PCT/DE2019/100073, filed on Jan. 24, 2019, which in turn claims priority to German Patent Application DE 10 2018 101 625.5, filed Jan. 25, 2018, both of which are incorporated herein by reference in their entirety.

FIELD OF THE INVENTION

The invention is directed to an apparatus for the direct optical capture of security-relevant objects such as at least skin prints, particularly for capturing papillary lines of fingerprints or hand prints for identifying persons, parts of the skin for medical purposes, textiles and foodstuffs, and for detecting the position of fingers on displays (e.g., for mobile devices) and optionally for capturing documents (e.g., passports, driver's licenses and any other identifying articles such as tickets, boarding passes, etc.).

BACKGROUND OF THE INVENTION

There are various approaches to the recording of skin prints for identification purposes. The optical capture of fingerprints for this purpose is very common.

In conventional prior art systems, fingerprints are recorded using the principle of frustrated total internal reflection (FTIR). The apparatuses used for this purpose have lens-based optics for imaging and a prism into which light is inputted at an angle such that it undergoes total internal reflection at the surface of the prism. When a finger is placed on the platen or placement surface, the light is coupled out of the prism into the finger at locations where the papillary lines (skin ridges) contact the surface. When the surface of the prism is imaged, an (inverted) image of the papillary lines results: light arrives at the sensor at locations where the papillary furrows (skin valleys) are located. Only very small proportions of the light that is backscattered at the skin ridges arrive on the sensor from those places where the skin ridges are located.

Use of the FTIR principle results in a very high brightness contrast between the skin ridges and the skin valleys. In this way, contrast values of greater than 90% are achieved in practice. However, the disadvantages of prism-based devices are the size and weight of the bulky prisms which are used and the susceptibility of the overall optical system to maladjustment.

The trend toward smaller, lighter fingerprint scanners has led to the development of a new class of compact transportable systems which likewise permit a high-quality (FBI-compliant) optical capture of fingerprints without prisms or lens-based optics. Compared to the conventional prism systems described above, the latter systems use large sensors on which the skin area to be recorded is effectively placed directly. An image is generated without conventional projection and without size scaling (magnification factor of 1.0). These systems are commonly referred to as direct scanners and hereinafter as direct sensors.

Depending on the constructional form of the utilized sensor and the illumination thereof, images can be generated in which either the skin valleys appear light (FTIR principle) or the skin ridges appear light (non-FTIR principle). The angle spectrum of the utilized illumination and the thickness of and refractive index of the optical layer located between the sensor and the placement surface for the skin area are decisive for image generation.

In a direct FTIR-type imager, the illumination ideally contains exclusively illumination angles that undergo total internal reflection at the placement surface. Accordingly, at the locations of the skin valleys one hundred percent of the light impinging internally on the placement surface arrives back in direction of the sensor. At the locations where the skin ridges touch the placement surface, portions of the illumination are coupled into the skin and are scattered (frustrated total reflection). The light which is backscattered diffusely from the skin surface amounts to about 40%. This component of backscattered light is likewise detected owing to the large acceptance angle (180°) of the individual light-sensitive sensor elements. Accordingly, a maximum Michelson contrast results for direct scanners based on the FTIR principle as follows:

$$K_m = \frac{100\% - 40\%}{100\% + 40\%} \approx 43\%.$$

In a direct scanner which does not operate on the FTIR principle, the illumination ideally contains no illumination angles that undergo total internal reflection at the placement surface. A skin area placed on the latter is illuminated through the placement surface, and the diffusely backscattered light is detected by the light-sensitive elements. The skin ridges appear lighter in the image than the skin valleys; the image is accordingly the inverse of FTIR systems. The reason for this is that there are additional refractive index transitions in the detection of light that is backscattered from the skin valleys. The light traverses the path from the skin surface (n≈1.3) into an air region (n=1.0) in the skin valley and, subsequently, into the uppermost layer (n≈1.5) of the direct scanner. In this case, scattered light simulations give a proportion of approximately 20% of the inputted light for the skin valleys and a proportion of 40% for the skin ridges. Accordingly, the maximum Michelson contrast for these systems amounts to only about:

$$K_m = \frac{10\% - 20\%}{40\% + 20\%} \approx 33\%.$$

Contrast values in the range of conventional prism-based devices cannot be generated with either of the two direct capture principles described above without undertaking additional steps because there is no conventional optical imaging channel and, therefore, all of the unwanted scattered light is also detected, since the acceptance angle of the light-sensitive elements of direct scanners amounts to virtually 180° without additional expenditures.

The low basic contrast compared to FTIR systems with prisms makes direct scanners less robust in the face of unfavorable imaging conditions such as, e.g., strong ambient light or different skin types.

A first group of solutions with contrast-enhancing elements are known in the prior art from US 2017/0161540 A1, US 2017/0161543 A1 and US 2017/0161544 A1 in which the light-sensitive elements can selectively detect only a required angular area through the use of angle-selective elements. However, these solutions have the drawback that the required angular area can only be limited through a plurality of layers or through curved surfaces, which makes the production of direct imagers of this kind complicated and costly.

Another approach to solving the contrast problem consists in receiving light from the skin valleys in that preferably light is detected from small acceptance angles close to the surface normals to the placement surface through the pinhole character of angle-selective elements as is described, for example, in WO 2017/045130 A1, WO 2017/063119 A1, US 2017/0017824 A1 and US 2016/0224819 A1. In arrangements of this kind, the Michelson contrast achieved in the captured biometric objects can never be close to 100% because some of the remitted light from the skin ridge is always also detected.

SUMMARY OF THE INVENTION

In view of the foregoing, it is the object of the invention to produce differences in brightness between skin ridges and skin valleys in direct sensors for capturing skin prints which are in the range of conventional FTIR systems with prisms (contrast greater than 90%). The solution shall be uncomplicated and simple to produce. It is a further object that the same direct sensor can also be used to capture documents with sufficiently high contrast.

An apparatus for direct optical capture of security-relevant objects such as at least skin prints has a sequence of layers including a cover layer with a placement surface for a security-relevant object, a contrast enhancing layer with transparent areas and nontransparent contrast shields for limiting incident angles of light that is remitted by the object through the placement surface into the layer sequence, a sensor layer with pixels which are arranged in a two-dimensional raster and which have in each instance a light-sensitive element and a transparent passage area, wherein the light-sensitive elements can only detect light coming from the direction of the placement surface, a substrate as support for the layer sequence, and an illumination layer for emitting illumination light which illuminates the object through the placement surface. In this apparatus, the above-stated object is met in that the contrast enhancing layer is formed for predominately passing light that is directly remitted by portions of the object placed on the placement surface without any air gap, wherein exactly one contrast shield is associated, as a nontransparent contrast shield of the contrast enhancing layer, with each light-sensitive element of the sensor layer, the respective associated contrast shield is arranged at a distance above the light-sensitive element and has a surface area which is at least as large as an active region of the light-sensitive element, and the contrast shield is arranged at a distance above the light-sensitive element such that—considered from direction of the placement surface—at least 60% of the active region of the light-sensitive element is covered, and such that the illumination layer contains a plurality of point light sources which emit in direction of the placement surface in an angular area which is limited in such a way that a total internal reflection is suppressed at the placement surface of the cover layer.

The respective associated contrast shield is advantageously arranged above the light-sensitive element in such a way that—considered from direction of the placement surface—at least 75%, preferably at least 90%, of an active region of the light-sensitive element is covered.

In a further advisable variant, the respective associated contrast shield is arranged above the light-sensitive element in such a way that—considered from direction of the placement surface—the active region of the light-sensitive element is completely covered.

For a space-saving construction of the direct sensor according to the invention, it proves to be advantageous that the cover layer is formed as the transparent substrate for the entire layer sequence.

In a further preferred variant, the respective associated contrast shield is formed above the light-sensitive element in such a way that the contrast shield has a protrusion distance relative to the active region of the light-sensitive element in at least two directions of the pixel raster that are offset by 90°. In particular, the contrast shield can have a geometrically similar surface area parallel to the active region of the light-sensitive element with identical orientation according to a central projection. The selected surfaces areas for the contrast shield and for the active region of the light-sensitive element are preferably rectangular, square, elliptical or circular.

For changing requirements with respect to security-relevant objects, it has proven advantageous when the contrast shield and the active region of the light-sensitive element have parallel geometric surface areas with shapes diverging from one another. The contrast shield and the active region can have different surface area shapes including rectangles, squares, ellipses or circles.

In order to improve the contrast and resolution of skin prints, the surface areas of the contrast shields advisably have a protrusion distance relative to the active regions of the light-sensitive elements, the magnitude of which is determined as a function of the refractive index of the cover layer, the distance of the contrast shields above the light-sensitive elements and the shape of the contrast shield and of the active region of the light-sensitive element.

In order to implement different capture modes for capturing different objects, it proves advantageous that the contrast enhancing layer has two or more different contrast shields which alternate with one another and which are offset relative to one another in a raster corresponding to the pixel raster over the active regions of the light-sensitive elements. This is preferable for capturing different objects which can range from fingers of different skin types, such as normal and moist or light and dark skin, to documents of various types.

In order to achieve higher-resolution captures and to improve the capture of documents as security-relevant objects, the contrast shield advantageously has an identical protrusion distance relative to the active region of the light-sensitive element in three directions which are offset by 90° within the contrast enhancing layer and a smaller protrusion distance, which can approach zero, in a fourth direction which is offset by 90°.

In a further improved variant in which the capture is achieved with the same increased resolution in two dimensions and the capture of documents can be improved, the contrast shield advisably has an identical protrusion distance relative to the active region of the light-sensitive element in two directions within the contrast enhancing layer which are offset by 90° and a shorter protrusion distance, which can approach zero, in two directions opposite to the two directions which are offset by 90°.

The distance of the contrast shields from the light-sensitive elements is preferably adjusted by means of an additional spacer layer with selectable layer thickness. In this respect, the distance of the contrast shields above the light-sensitive elements is advisably adjustable within a range of between 10 nm and 1 mm. The distance is preferably adjusted within a range of from 0.5 µm to 50 µm, where the distance is particularly preferably realized through adjustment of a layer thickness between 1 µm and 10 µm.

The illumination layer is advantageously formed as a large-area backlight coupled to the layer sequence below the sensor layer with an intermediate layer or an air layer. The large-area illumination layer is preferably a display which is preferably coupled to the bottommost layer of the layer sequence via an air layer. The bottommost layer can either be a transparent substrate or is the sensor layer in case the cover layer is formed as substrate.

In an alternative variant, the illumination layer can advantageously be formed as point light sources which are singularly arranged in an offset manner within the sensor layer in the passage areas of the pixels and outfitted with beam-limiting apertures. In this connection, point light sources in the form of LEDs, OLEDs and QLEDs can be used in the sensor layer.

In an especially advantageous configuration, the contrast enhancing layer is formed for predominantly passing light that is remitted by portions of the object which lie on the placement surface without an air gap and for an additional component of light that is remitted by portions of the object which lie on the placement surface with an air gap, and the respective associated contrast shield is arranged above the light-sensitive element such that—considered from direction of the placement surface—the active region of the light-sensitive element is completely covered, and the contrast shield has a recess within a surface area covering the active region so that a component of predominantly perpendicularly impinging light can be additionally received in the area of the recess.

In an advantageous configuration of the contrast shield, the recess is preferably a recess which is in the form of a circular hole, elongated hole, slot, notch, sector or cutout of another shape and which is arranged inside the surface area of the contrast shield, which surface area covers the active region of the light-sensitive element.

In a further advantageous configuration of the contrast shield, the recess is a recess in the form of a circular hole, elongated hole, slot, notch, sector or cutout of another shape which is arranged in a protrusion distance of the contrast shield relative to the active region.

The invention is based on the underlying consideration that when capturing objects for the identification of persons, e.g., fingerprints, handprints or footprints, the biometric features, the papillary lines, can be captured in different ways. With direct optical sensors for capturing skin prints, the papillary lines are in direct contact with the placement surface of a sensor, and the contrast between skin ridges and skin valleys results from the different refractive index transitions thereof at the placement surface. The contrast between papillary ridges (skin ridges) and papillary furrows (skin valleys) of the skin print is key for achieving the quality specifications of the FBI (in accordance with EBTS, Appendix F). A theoretical maximum contrast in a direct optical sensor with diffuse illumination which can reach only 33% in accordance with the formula given above is obviously too low considering that a high contrast is the first basic prerequisite for high image quality. Although FBI-compliant images can be generated with a basic contrast of 50% under ideal conditions, a higher basic contrast in the unprocessed image offers reserves which ensure the required high image quality even under poor boundary conditions (dry or moist skin, dark skin type, ambient light or a dirty placement surface).

The problem which always occurs in direct sensors is that the contrast is too low. The invention solves this problem by means of a novel detection principle for optical capture.

The basic principle consists in that the light which is backscattered (remitted) from the object placed on the placement surface is detected while making use of the possibility that the remitted light or a component thereof can be modified by angle-selective elements on the path from the placement surface of the apparatus to the light-sensitive elements of a large-area sensor layer. According to the invention, the acceptance angle of the light-sensitive elements is changed such that detection of certain angular areas of the light remitted from the object on the placement surface is favored or prevented. In particular, detection of scatter light components remitted from the two different skin parts, the skin ridges and the skin valleys, in the same angular area is not permitted, so that a higher contrast can be realized in that only a surplus portion of the scattered light which originates from the skin ridges and which enters the direct imager as remitted light under larger angles is utilized for signal acquisition. This is carried out in that the scattered light that is remitted from the skin parts and impinges on the light-sensitive elements at small incident angles is blocked (shaded) through a contrast shield in each instance which substantially centrally covers the light-sensitive elements.

The invention makes it possible to so improve the differences in brightness between skin ridges and skin valleys in direct scanners for capturing skin prints so as to achieve the range of conventional FTIR systems with prisms (contrast greater than 90%). The invention also meets the expanded object of capturing documents with a sufficiently high contrast with the same direct sensor.

BRIEF DESCRIPTION OF THE DRAWINGS

The invention will be described more fully in the following with reference to embodiment examples. The drawings show:

FIG. 7B a side view as sectional view of the embodiment form from FIG. 7a;

DETAILED DESCRIPTION OF THE PREFERRED EMBODIMENTS

The layer sequence of an apparatus for direct optical capture of security-relevant objects (hereinafter, for the sake of brevity, direct optical sensor) is shown schematically in a sectional view in FIG. 1. Security-relevant objects are skin areas such as, for example, the imprint of a finger 101, handprints or footprints, and documents 105 (only shown in FIGS. 5, 6 and 10) for identifying persons such as, e.g., identification card, passport, driver's license, credit card or visiting card.

Figure 1:
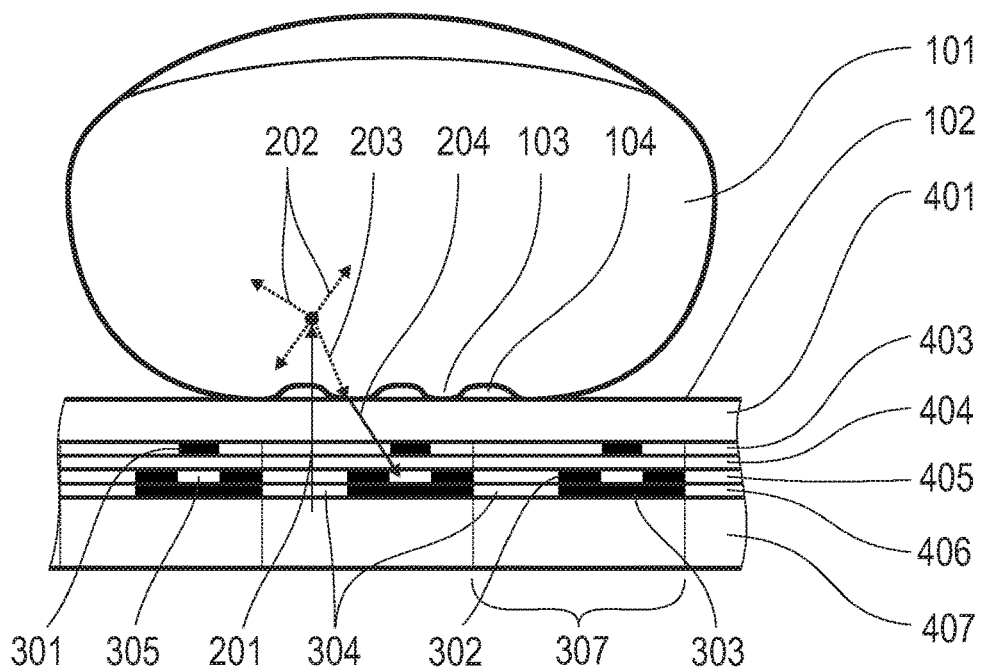
FIG. 1 a basic construction of the apparatus according to the invention for capturing skin prints.

FIG. 1 schematically shows a finger 101 with a plurality of skin ridges 103 and skin valleys 104 which is placed on the placement surface 102 of the direct optical sensor. The placement surface 102 is usually formed by the outer surface of a resistant transparent cover layer 401 on which more than one finger 101 can also be placed simultaneously. FIG. 1 schematically shows the sensor structure for the optical capture of the placed finger 101 by reference to three pixels 307 which are formed in each instance from a light-sensitive element 303 and a transparent passage area 304. A possible light path of illumination light 201 is directed, for example, from one of the passage areas 304 for illumination of the finger 101 at the underside thereof in direction of the placement surface 102 and, in the object placed on the latter, in this case, the finger 101, leads to point conversion into scattered light 202, wherein scattered light 203 directed toward the placement surface 102 enters the direct sensor as remitted light 204 which can be received by a light-sensitive element 303 under certain preconditions.

The apparatus according to the invention comprises, proceeding from the direction of the finger 101, a cover layer 401 with placement surface 102 for the objects to be captured, a contrast enhancing layer 403, a spacer layer 404, a sensor layer 406 and a substrate 407.

The substrate 407 forms the foundation for building the layer sequence of the direct optical sensor. Conductors, semiconductors and insulators are arranged on the substrate 407 by means of photolithography processes which are known from the prior art as TFT (Thin Film Transistor) technology. Alternatively, it is also possible to produce the direct optical sensor by means of printing methods, for example, by screen printing methods. Substrate 407 preferably comprises a transparent material such as plastic or glass to enable the passage of illumination light 201 coming through the entire layer sequence from direction of the passage areas 304 of the pixels 307 of sensor layer 306 and illuminating the placement surface 102 through the object, finger 101 or document 105.

The substrate 407 carries a sensor layer 406 having pixels 307 arranged in a regular two-dimensional raster. Every pixel 307 has a light-sensitive element 303 for converting light into electrical signals and a passage area 304, which is transparent in this embodiment example, for transmitting illumination light 201 from below the substrate 407. The light-sensitive elements 303 are photodiodes which are so constituted that they cannot detect any light from below from direction of substrate 407. This is realized via a diaphragm comprising a nontransparent material at the underside of the photodiode as is known and conventional in the prior art. The light-sensitive elements 303 commonly have an acceptance angle of approximately 180° and are so constituted that they detect light of a predetermined wavelength range from direction of placement surface 102. Pixels 307 preferably detect a wavelength range in the visible radiation spectrum between 380 and 780 nm. To capture FBI-compliant images, sensor layer 406 preferably has a mean spacing of the light-sensitive elements 303 of ≤50.8 µm, which corresponds to a resolution of 500 ppi (pixels per inch) or more.

The passage areas 304 between the light-sensitive elements 303 comprise a material which is at least partially transparent to illumination light 201. Transparent coating materials such as silicon dioxide or aluminum oxide which are adapted to the thickness of the light-sensitive elements 303 during the coating process are preferably used. In this way, the sensor layer 406 is leveled before the next coating step.

In most applications of the direct optical sensor, it is advantageous to limit the effective surface area of the light-sensitive elements 303 in a defined manner and also to restrict the acceptance angle to a slight extent in order to adjust the light sensitivity to the degree required for the application and, at the same time, to realize a light-sensitive element 303 which is as large as possible for an improved signal-to-noise ratio. In this case, a diode diaphragm layer 405 comprising transparent areas and nontransparent areas is arranged over the sensor layer 406. The nontransparent areas of the diode diaphragm layer 405 form diode diaphragms 302 which shade a surface area portion of the periphery of the light-sensitive elements 303. The portion of the light-sensitive element 303 not covered by the diode diaphragm 302 forms an exactly delimited active region 305 in which light can still be detected. Precisely one diode diaphragm 302 which determines the active region 305 of the light-sensitive element 303 and of the pixel 307 is associated with each light-sensitive element 303. The transparent areas of the diode diaphragm layer 405 between the diode diaphragms 302 overlap the passage areas 304 of the sensor layer 406 surface area-wise and are preferably made of the same material as the passage areas 304.

Located above the diode diaphragm layer 405 is a transparent spacer layer 404 which produces a defined space between the active region 305 of the light-sensitive elements 303 and the contrast enhancing layer 403. The spacer layer 404 has a thickness of between 0.01 and 1000 μm. The thickness of the spacer layer 404 is preferably between 0.5 μm and 50 μm, particularly preferably in the range of from 1 to 10 μm. The spacer layer 404 is made of a transparent organic or inorganic material, preferably an organic material to achieve a better leveling effect and larger layer thicknesses.

A contrast enhancing layer 403 having transparent areas and nontransparent contrast shields 301 is arranged over the spacer layer 404. Exactly one contrast shield 301 within the contrast enhancing layer 403 is associated with each light-sensitive element 303 of the sensor layer 406. The contrast shields 301 cover substantial surface area portions of the active region 305 of the light-sensitive elements 303 and surface area portions of the diode diaphragms 302. The contrast shields 301 have a limiting effect for active regions 305 of light-sensitive elements 303 on the angle of incidence of scattered light 203 remitted into the direct sensor from finger 101 via placement surface 102. Contrast shields 301 are formed for a favored passage of scattered light 203 that is remitted directly from portions of finger 101 lying on the placement surface 102 without an air gap 106 and enters the active regions 305 of the light-sensitive elements 303 as remitted light 204 at a large angle of incidence. The limiting of the incident angles of remitted light 204 which are detectable by the light-sensitive elements 303 will be explained in the following referring to FIGS. 4a and 4b.

Nontransparent materials are required for diode diaphragms 302 and contrast shields 301 for effectively blocking remitted light 204. Preferred nontransparent materials which are used owing to their excellent suitability for structuring in photolithography coating processes are, for example, metals such as chromium, aluminum, gold, molybdenum, copper, silver and silicon. However, owing to the reflective qualities of these materials, unwanted reflections can occur at the surfaces of the diode diaphragms 302 and contrast shields 301 and have a limiting effect on contrast, increase noise or generate double images. Therefore, absorbent organic materials such as, e.g., polytetrafluoroethylene and absorbent inorganic materials such as diamond-like carbon films, chromium(II) oxide, copper indium disulfide or materials with a specific microstructure are primarily used. Materials which can be applied as diode diaphragms 302 and contrast shields 301 via printing processes, e.g., screen printing, are particularly preferred because they can be produced quickly, flexibly and inexpensively. In printing processes, chiefly organic materials are used.

Located above the contrast enhancing layer 403 is the cover layer 401 which protects the direct optical sensor from mechanical and chemical stresses and, with its outer surface, forms the placement surface 102 for objects such as finger 101 or document 105. Cover layer 401 has a layer thickness in the range of from 1 μm to 10 mm, preferably 10 μm to 1000 μm and particularly preferably 50 μm to 200 μm. It is advantageous that the cover layer 401 is as thick as possible in order to ensure a particularly good level of mechanical and chemical protection. Beyond this, however, the cover layer 401 should also be thin enough for good integration of the direct sensor in mobile devices in which a small overall thickness is desirable. Cover layers 401 made of plastic which are removable and exchangeable by the user without leaving residue are particularly user-friendly. Hard cover layers 401 made of glass, chemically strengthened glass, fused quartz, sapphire or ceramics, for example, are particularly preferred.

The transparent areas of all of the layers of the layer sequence of the apparatus according to the invention preferably have similar optical characteristics (particularly matching refractive indices) in order to minimize reflection losses at the interfaces between layers. The refractive indices of all of the transparent layers are preferably $n=1.5\pm0.2$.

An adhesive layer 402 (not shown in FIG. 1) which has a refractive index of $n=1.5\pm0.2$ and which optically couples or bonds the cover layer 401 to the layer sequence below it can be provided for reducing reflection losses between cover layer 401 and contrast enhancing layer 403. The adhesive layer 402 is preferably an optically transparent adhesive (LOCA—Liquid Optical Clear Adhesive) or an optically transparent double-sided adhesive foil (OCA—Optical Clear Adhesive). Transparent glues based on acrylates, epoxides and silicones are particularly preferred.

In order to suppress the detection of interfering ambient light, one or more spectral filter layers 411 (not shown in FIG. 1) can be integrated in the layer sequence of the direct sensor. The ambient light protection required by some users, where the direct sensors must also function in direct sunlight, can be implemented in this way. In order to prevent saturation of the light-sensitive elements 303 by the ambient light, one or more whole-surface-area spectral filter layers 411 may be embedded (shown only in FIG. 2B) between the light-sensitive elements 303 and the placement surface 102. A spectral filter system of this kind can be arranged over the whole surface of the direct sensor as continuous layer system. The spectral filter layer 411 is so adapted that preferred ambient light is absorbed or reflected and at least a portion of the illumination light 201 is transmitted.

A structured spectral filter layer 412 (shown only in FIG. 3) with transparent areas and absorbent areas in which the absorbent areas are located at least over the active regions 305 of the light-sensitive elements 303 is preferably provided. The absorbent areas are preferably arranged in such a way that none of the illumination light 201 is absorbed through the structured spectral filter layer 412.

Spectral filter layer 411 or 412 lies between sensor layer 406 and cover layer 401, particularly preferably between sensor layer 406 and contrast enhancing layer 403. The cover layer 401 itself can also be formed (not shown) as spectral filter layer 411 (e.g., colored glass). In a further embodiment form, the light-sensitive elements 303 are formed so as to be wavelength-selective only for the wavelength of the illumination light 201. All of these steps can also be combined with one another.

Possibilities for implementing spectra filters include, for example, absorbent organic and inorganic dyes and particles, resonant metal nanoparticle filters (plasmonic filters) and interference filters. If a liquid adhesive is used to connect cover layer 401 to contrast enhancing layer 403, the ambient light protection can also be integrated therein and the spectral filter layer 411 would then be realized (not shown) in the adhesive layer 402. The spectral filter layer 411 or 412 preferably only passes those wavelengths or wavelength ranges that cannot penetrate through the positioned object, finger 101 or document 105. The narrower the transmission band of the spectral filter layer 411 or 412, the better the ambient light (e.g., sunlight) is blocked. Of course, it is also possible to combine a plurality of spectral filters or to configure the spectral filter layer 411 or 412 in such a way that it is selective for a plurality of wavelength ranges.

When an object, finger 101 or document 105 which is placed on the placement surface 102 is illuminated by illumination light 201 from direction of the passage areas 304 of sensor layer 406, the illumination light 201 at least passes through passage area 304 of sensor layer 406, diode diaphragm layer 405, spacer layer 404, contrast enhancing layer 403 and cover layer 401. All of the layers of the direct sensor are transparent to at least components of the illumination light 201.

When an object, for example, a finger 101 as is shown in FIG. 1, contacts the placement surface 102 and is ready to be captured, illumination light 201 passes via the transparent areas of the apparatus through the placement surface 102 to finger 101. When impinging upon the finger 101 resting on the placement surface 102, illumination light 201 is inputted into the finger 101 and is scattered. The direction of the scattered light 202 is stochastic owing to multiple scattering. A portion of the scattered light 202 proceeds as scattered light 203 in direction of placement surface 102 and enters cover layer 401 as remitted light 204 via the papillary ridge (skin ridge 103) at the placement surface 102. Proceeding from the cover layer 401, the remitted light 204 penetrates the rest of the layer sequence and is finally received in the active region 305 of the light-sensitive elements 303, wherein the detected light intensity is converted into an electrical signal and subsequently recalculated into a grayscale image. Similarly in skin valleys 104, scattered light 203 is outputted from the latter initially into the air gaps 106 of the skin valleys 104 and subsequently enters cover layer 401 via placement surface 102 as remitted light 204. Owing to the additional optical transition with remitted light 204 from skin valleys 104, the light loss is greater than with skin ridges 103 which contact without an air gap 106. This light loss is detected by the light-sensitive elements 303 and is represented as contrast between skin ridges 103 and skin valleys 104.

The angle spectrum of the incident radiation direction of remitted light 204 is stochastic owing to the multiple scattering in finger 101. There are a number of possible directions, and the sum of all possible light paths of the light 204 remitted into cover layer 401 (refracted at placement surface 102) describes a light cone. Two limit angles 205 and 206 (only shown in FIGS. 4A and 4B) of the remitted light 204 are defined in cover layer 401 through the refractive index transition between skin ridge 103 and cover layer 401 or air gap 106 and cover layer 401. The component of remitted light 204 detected by the active regions 305 depends on the position and configuration of the contrast enhancing layer 403 which restricts the light path of remitted light 204.

Figure 2A:
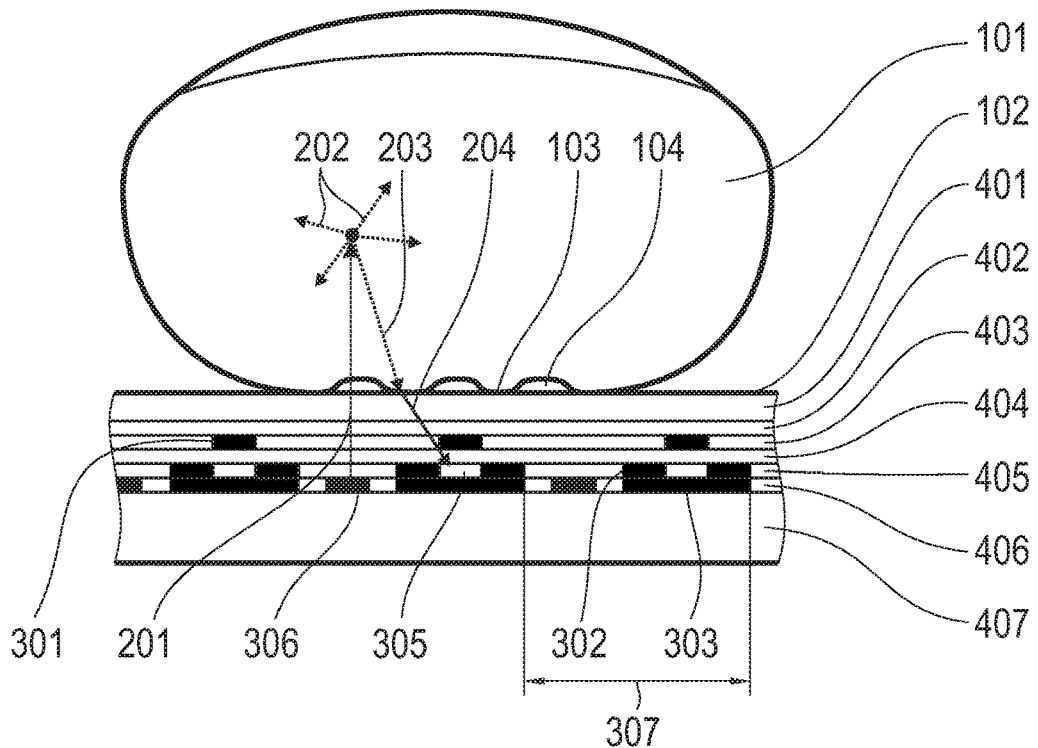
FIG. 2A a side view (sectional view) of a preferred embodiment form of the apparatus according to the invention in which the illumination layer is integrated into the sensor layer in the form of a plurality of point light sources.
Figure 2B:
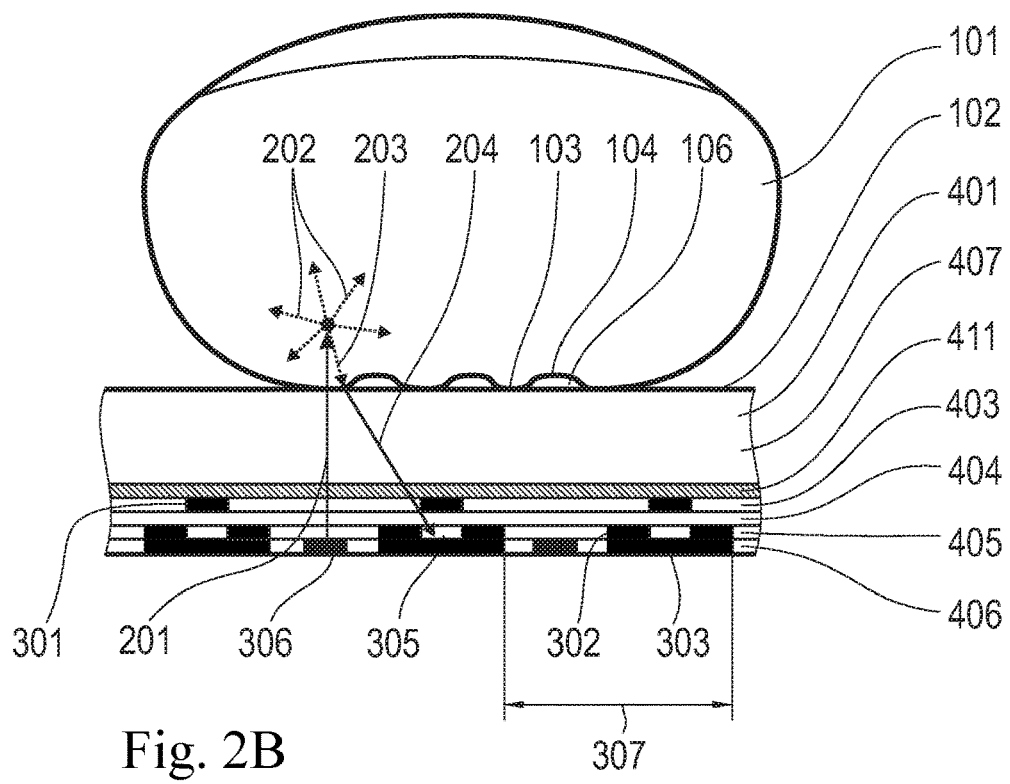
FIG. 2B a side view (sectional view) of a further embodiment form of the apparatus according to the invention in which the illumination layer is integrated into the sensor layer in the form of a plurality of point light sources, and the cover layer simultaneously forms the substrate for the layer sequence.

In FIGS. 2A and 2B, the illumination light 201 is emitted through point light sources 306 such as LEDs, OLEDs, QLEDs or LCDs and illuminates the placed finger 101 diffusely, i.e., illumination light 201 is radiated at every angle. Individual point light sources 306 are not associated directly with a light-sensitive element 303; that is, a light-sensitive element 303 detects remitted light 204 from the sum of a plurality of point light sources 306.

A preferred embodiment form of the apparatus is shown schematically in side view in FIG. 2A. An illumination layer 409 (from FIG. 1) for emitting illumination light 201 is integrated into the sensor layer 406. The point light sources 306 are arranged within the sensor layer 406 so as to be offset to the light-sensitive elements 303 in the passage areas 304 of pixels 307 and emit diffuse illumination light 201 into the upper half-space in direction of placement surface 102.

Means for collimating the illumination light 201 of point light sources 306 or further beam-limiting features (not shown) can be used to prevent total internal reflection at the placement surface 102 of cover layer 401. This can be realized, for example, through a suitable arrangement of diode diaphragms 302 and/or contrast shields 301 in the diode diaphragm layer 405 or contrast enhancing layer 403.

Further, as has already been described, there is no direct association between point light source 306 and light-sensitive element 303 because the light cones of the point light sources 306 can overlap in the placement surface 102 and multiple scattering can come about in finger 101 before the remitted light 204 entering the cover layer 401 is detected.

Figure 10:
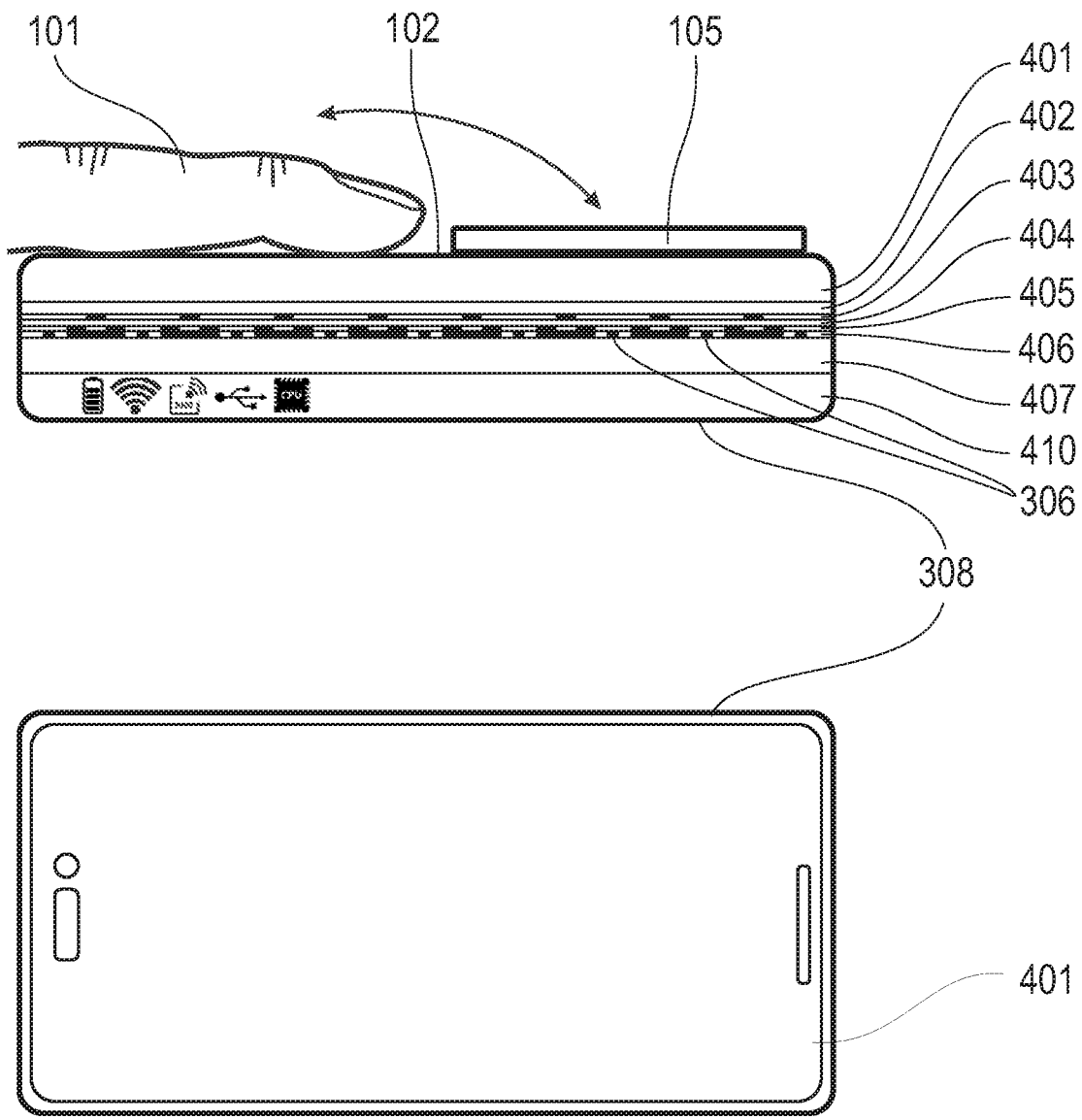
FIG. 10 a side view and a top view of a mobile device in which the apparatus according to the invention is integrated.

An advantage of the embodiment form of FIG. 2A consists in that the substrate need not necessarily be transparent, since the point light sources 306 for emitting illumination light 201 are arranged over the substrate 407. Likewise, a thinner apparatus is realized through the integration of illumination into sensor layer 406, which is advantageous particularly for mobile applications. An apparatus of this kind fully integrated in a mobile device (e.g., cell phone, tablet, etc.) in which the direct optical sensor is integrated into the entire surface of the display and an object (e.g., finger 101 or document 105) can be captured with a high image quality on the entire display surface of the mobile device is shown in FIG. 10 as an embodiment form of the invention.

In a further embodiment form of the apparatus for direct optical capture of security-relevant objects, the cover layer 401 with the placement surface 102 is formed at the same time as transparent substrate 407 for the layer sequence as is shown in FIG. 2B. Accordingly, the substrate 407 originally located below the sensor layer 406 as shown in FIGS. 1 and 2A can be dispensed with. In this case, the cover layer 401 is provided as substrate 407, and the contrast enhancing layer 403 is arranged first and a spectral filter layer 411 is applied before or after as the case may be. Subsequently, spacer layer 404, diode diaphragm layer 405 and sensor layer 406 are applied consecutively. This has the advantage that the total thickness and the production costs of the apparatus are reduced because a separate substrate 407 or a separate cover layer 401, an adhesive layer 402 and the accompanying joining process are dispensed with. Possible applications for this embodiment form are in mobile devices in which a small thickness is advantageous and the back side of the sensor layer 406 is encapsulated by the device frame or a simple and advantageous alternative, for example, a plastic film.

A preferred embodiment form of the apparatus in which the illumination layer 409 is a display placed below the substrate 407 is shown schematically in side view in FIG. 3. An air layer 408 is preferably located between illumination layer 409 and substrate 407 in order to limit the angle spectrum of illumination light 201 through the optical transition from air to substrate 407. In principle, the display can also be optically coupled to the substrate 407 via a further adhesive layer (not shown) instead of air, but then the advantage of angle limiting is no longer provided.

Figure 3:
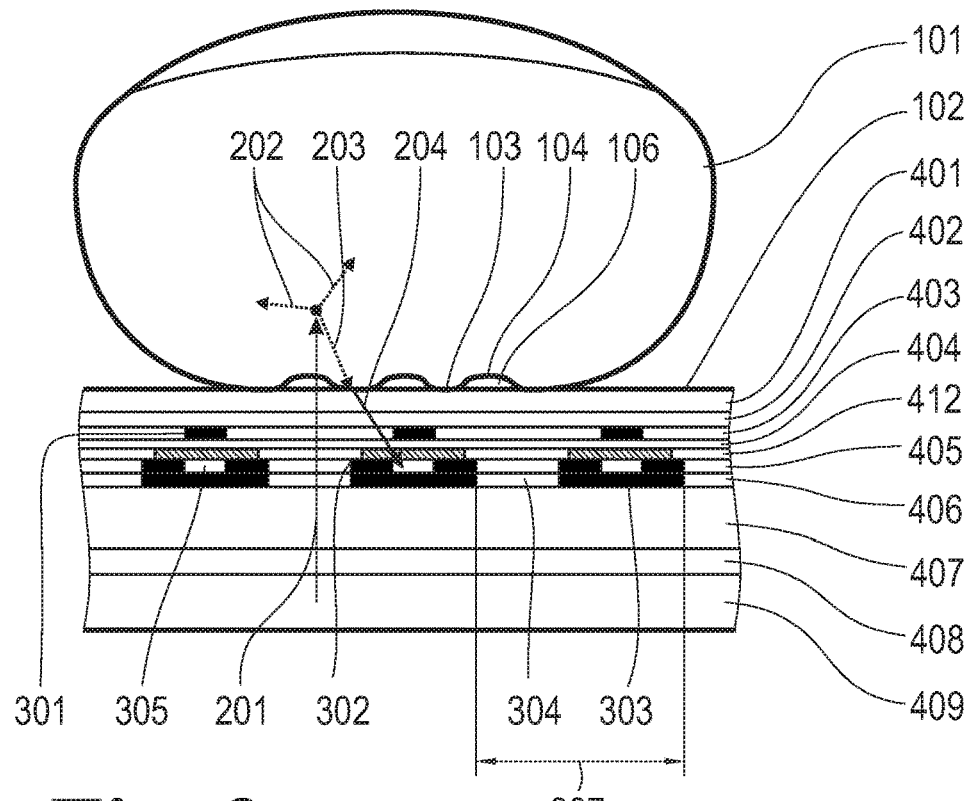
FIG. 3 a side view (sectional view) of a further preferred embodiment form of the apparatus according to the invention in which the illumination layer is coupled with a display as backlight below the substrate.

An illumination layer 409 in the form of a display with individually controllable point light sources 306 (not shown) is preferably used in FIG. 3 so that an object, finger 101 or document 105 placed on the placement surface 102 can be illuminated in a structured manner A display which emits illumination light 201 with different wavelengths in the visible spectral region is particularly preferred so that helpful color-highlighted information can be displayed to the user. Accordingly, a user guide can be integrated so that use of the direct sensor is more comprehensible. The resolution of the point light sources 306 of the backlight or display can be between 100 and 1000 ppi, preferably in the range of 300 to 500 ppi.

Through the additional air layer 408, the diffuse illumination light 201 is refracted at the air layer 408—substrate 407 interface when entering substrate layer 407. As has already been described, this leads to a limiting of the angle spectrum of illumination light 201. This has the advantage that the illumination light 201 does not undergo total reflection at the upper surface of cover layer 401, which would otherwise lead to a reduced contrast.

Figure 4A:
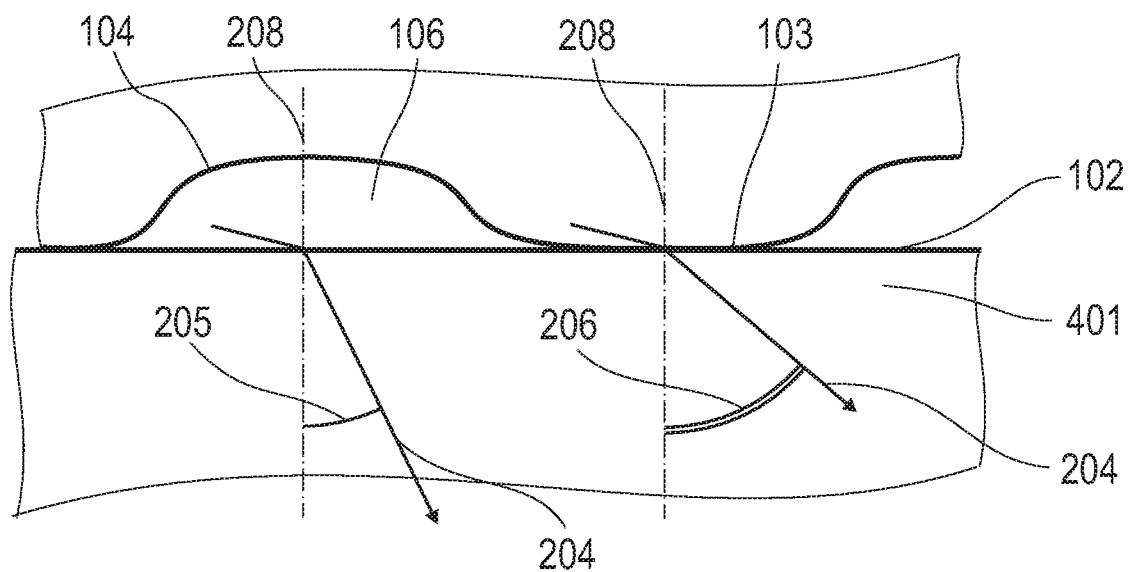
FIG. 4A a schematic view of the limit angle for a grazing light incidence for the different media transitions from skin ridge and skin valley on the placement surface as interface.

In order to explain the principle of the invention for increasing contrast, FIG. 4A schematically shows in a sectional view the limit angles 205 and 206 for a grazing light incidence at the placement surface 102 which has an interface for two different media transitions or refractive index transitions of skin ridge 103 (direct skin contact) and skin valley 104 (air gap 106). As has already been described, there is more than one possible light path of the remitted light 204 owing to the scattering in the object lying on the placement surface 102, and the sum of all of the light paths describes a light cone with a defined limit angle 205 or 206. The limit angles 205 or 206 describe the respective angle of the remitted light 204 after the light refraction at the interface of the two above-mentioned materials for a grazing light incidence and are dependent on the optical properties of the two materials (skin, air) from which the light proceeds and of the material (e.g., glass) in which the different light components are remitted.

The limit angle 205 for the transitions from air to cover layer 401 and the limit angle 206 for transitions from skin to cover layer 401 are shown schematically. In both cases, the cover layer 401 is the optically denser medium so that the light is refracted toward the perpendicular 208 of placement surface 102. The angle spectrum of the remitted light 204 is restricted. For further calculations, let it be assumed, for example, that a cover layer 401 of glass has a refractive index of n=1.517 (refractive index of BK7 glass) and the skin has a refractive index of n=1.376 (refractive index of cornea). Air with a refractive index n=1 is located in the skin valleys 104 between the skin ridges 103. The refractive index applies for a wavelength of 600 nm. Owing to the light refraction at the placement surface 102, the remitted light 204 describes a light cone with a defined angular area between the perpendicular 208 of the placement surface 102 and the limit angle 205 or 206. A first type of light cone of remitted light 204 for the transition from skin to glass has a limit angle 206 of approximately 65°, and a second type of light cone for the air-to-glass transition has a limit angle 205 of approximately 41°. If both types of light cone are completely detected in each instance by the light-sensitive elements 303 (without additional shields), this results in a low contrast between skin ridges 103 and skin valleys 104 because the first type of light cone and second type of light cone differ only slightly with respect to their energy content. For the intended sharper differentiation between the detection of the two types of light cones of remitted light 204 in order to heighten the contrast between skin ridges 103 and skin valleys 104, the portion of the angular areas which both types of light cones include is partially or completely blocked by the contrast shields 301 according to the invention. In this way, the relative proportion of angular areas which occur only at the transition from skin ridge 103 to cover layer 101 is increased during detection.

Figure 4B:
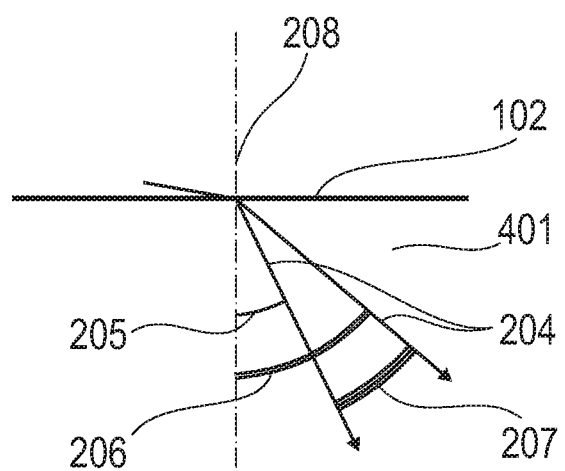
FIG. 4B a schematic view of the overlaying of different limit angles for the input of scattered light from skin ridge and skin valley into the cover layer shown in a stylized manner at a location on the placement surface for clarifying the differential angular area.

FIG. 4B shows the differential angular area 207 in a schematic sectional view. The differential angular area 207 describes an angular area of remitted light 204 which is remitted exclusively from the skin ridges 103 resting on placement surface 102 into cover layer 401. This means that, for example, no light that is inputted into cover layer 401 from the air gap 106 in the skin valley 104 is remitted in differential angular area 207.

The purpose of the contrast enhancing layer 403 according to the invention is to limit the angular area of the light-sensitive elements 303 in which the latter can detect the remitted light 204 such that the type of light cone with the smaller limit angle 205 (approximately 41° with BK7 as cover layer 401) generated in the transition between the air gap 106 in skin valley 104 and the cover layer 401 can only be detected by the light-sensitive elements 303 to a small extent or not at all. The light 204 remitted from skin valleys 104 is virtually completely blocked, whereas only a portion of the light 204 remitted from skin ridges 103 is blocked. This concerns the angles between 0° and limit angle 205 for the air-glass transition (41°). Contrast shield 301 is preferably arranged in such a way that predominantly remitted light 204 with incident angles greater than approximately 41° to the perpendicular 208 of placement surface 102 is detected by the light-sensitive elements 303. Accordingly, as can be deduced from FIGS. 4A and 4B, exclusively remitted light 204 which was remitted from skin ridges 103 into the layer sequence is detected. The contrast between skin ridges 103 and skin valleys 104 is substantially increased in this way because the interfering light 204 remitted from the skin valleys 104 is blocked and is not detected.

The contrast shields 301 may be optionally configured with respect to shape and position to a great extent, this constituting merely a further coating and structuring process step or printing process in the production of the direct optical sensor. A process step of this kind can be integrated without difficulty for producing the layer sequence so as to improve the contrast of captured skin prints.

High-contrast capture of moist fingers 101, also known as "water rejection" remains an ongoing problem in direct optical sensors. The reason for this is that skin and water have a similar refractive index in the visible spectrum of light, namely, 1.376 for skin and 1.33 for water, so that the limit angles 205 and 206 of the remitted light 204 in both instances are very close to one another. In a further embodiment form, high-contrast capture of moist fingers 101 is realized in that light 204 remitted into the layer sequence from the transition of water (n=1.33) to cover layer 401 (e.g., BK7 glass, where n=1.517) is completely blocked by a correspondingly configured contrast shield 301. In this case, the contrast shield 301 completely limits the detection of remitted light 204 up to a corresponding limit angle of the water-glass transition (not shown). This limit angle amounts to approximately 61° (for BK7) while the differential angular area 207 can still be detected. This means that the light cone remitted from the contacting skin ridges 103 has the larger limit angle 206 of approximately 65° and remitted light 204 is still detected. However, a large proportion of the remitted light 204 from the contacting skin ridges 103 is likewise blocked and the signal-to-noise ratio decreases. To compensate, the light intensity of illumination light 201 can be increased, for example.

For this or the like special cases, two or more differently configured contrast shields 301 are integrated in one and the same direct optical sensor in a preferred embodiment form in order to allow the contrast-optimized capture of, e.g., normal fingers 101, moist fingers 101 and documents 105 by the same apparatus. The configurations of the different contrast shields 301 are optimized for the contrast-optimized capture of objects or in different application scenarios and are alternately arranged in the layer sequence. The configuration of certain light-sensitive elements 303 with associated contrast shields 301 as sunlight sensors, for example, for detecting the intensity of ambient light, is also possible. A large projection 501 (not shown, see FIGS. 7A, b) of contrast shield 301 relative to active region 305 ensures that no oversaturation of the light-sensitive element 303 will occur even at very high ambient light intensity so that the latter becomes measurable.

Figure 5:
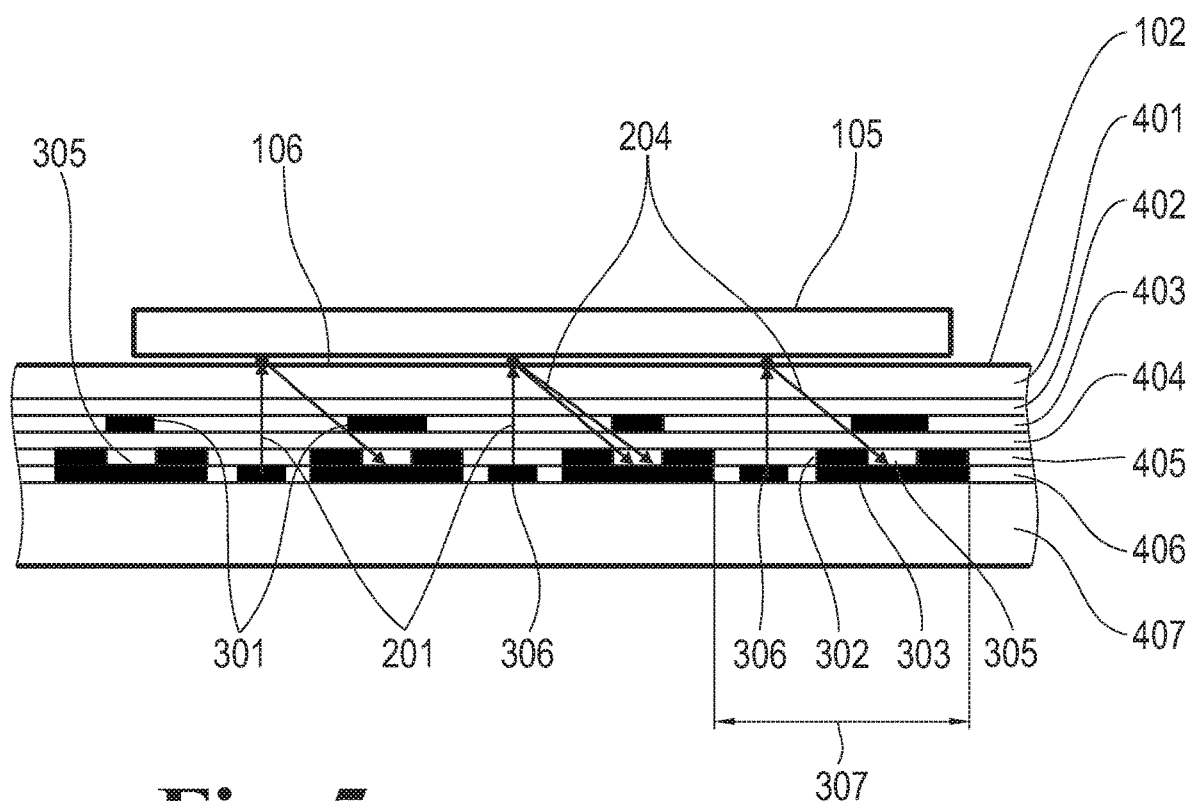
FIG. 5 a side view (as schematic sectional view) of the apparatus according to the invention in an embodiment form for capturing a document which is illuminated by point light sources contained in the sensor layer.

If different contrast shields 301 are integrated in a direct optical sensor (as is shown in FIG. 5) and if the layer sequence is optimized in this way for different capture scenarios, the resolution for each individual capture scenario is consequently lowered because there are fewer ppi available for each capture scenario. This can be compensated by using direct optical sensors with a higher resolution (ppi).

In a method which uses two different contrast shields 301 on the same direct optical sensor, a first image is captured with a first contrast shield arrangement which is configured for high-contrast capture of normal skin areas (blocks remitted light 204 in a light cone up to the angle of 41° to the perpendicular 208 of placement surface 102) and with a first light intensity of illumination light 201. An image evaluation algorithm evaluates the contrast between skin ridges 103 and skin valleys 104. If the contrast value lies below a minimum threshold, a second image is captured with a second contrast shield arrangement which is configured for high-contrast capture of moist skin areas (blocks remitted light 204 in a light cone up to the angle of 61° to the perpendicular 208 of placement surface 102) and with a second light intensity of illumination light 201. The second image is stored and sent to the electronics of a device with the direct optical sensor for further processing, e.g., for matching with a stored fingerprint. The second light intensity of illumination light 201 is greater than the first light intensity of illumination light 201 in order to ensure a good signal-to-noise ratio, since more light paths of the remitted light 204 are restricted in the second contrast shield arrangement.

Figure 6:
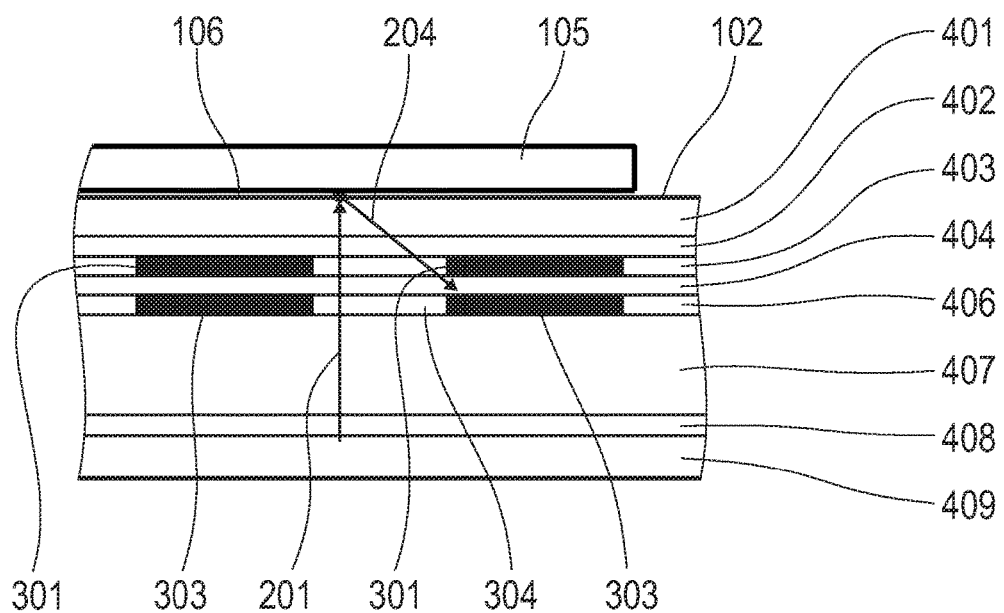
FIG. 6 a schematic section of the apparatus according to the invention with light-sensitive elements without diode diaphragm layer and with fully covering contrast shield for capturing a document which is illuminated under the sensor layer with an illumination layer as backlight.

The capture of documents 105 (passports, visiting cards, driver's licenses, etc.) as is shown in FIGS. 5 and 6 poses special challenges for the contrast enhancing layer 403, since there is always a thin air gap 106 between the document 105 and the placement surface 102 because the surface of a document 105 is not optically coupled to the placement surface 102.

FIG. 5 shows a schematic side view of the apparatus according to FIG. 2A in which, by contrast, a document 105 and not a finger 101 lies on the placement surface 102 and is captured.

In this example, as in FIG. 2A, illumination light 201 is likewise generated by point light sources 306 arranged within the pixel raster of the sensor layer 406 in the transparent passage areas 304. The point light sources 306 are outfitted with beam-limiting or collimating devices (not shown) to prevent total internal reflection at the placement surface 102 of cover layer 401. When the document 105 is illuminated with illumination light 201, scattering occurs at the surface of document 105. The light which is backscattered in direction of the cover layer 401 traverses air gap 106 between document 105 and cover layer 401 and enters the layer sequence of the direct sensor as remitted light 204 via placement surface 102. Through the air gap 106, the limit angle 205 of the remitted light cone amounts to approximately 41° (when BK7 is used as cover layer 401). If the contrast apertures 301 were configured exclusively for the contrast-optimized capture of fingerprints, documents 105 could no longer be captured because remitted light 204 with angles of less than 41° relative to the perpendicular 208 of placement surface 102 is completely blocked through contrast shield 301.

As has already been described and as is shown in FIG. 5, the direct optical sensor can have different contrast shields 301 arranged next to one another for particular capture scenarios. In this case, contrast shields 301 are arranged alternately side by side for high-contrast capture of skin prints (e.g., finger 101) as well as of documents 105.

Further, for controlling the sensor electronics (shown only in FIG. 10), it is possible to switch back and forth between capture modes using differently configured contrast shields 301 so that only one half of the light-sensitive elements are read out depending on whether a document 105 or a finger 101 is being captured.

In a further embodiment form, an additional infrared diode and an infrared sensor are used before the capture to check whether a finger 101 or a document 105 is approaching the placement surface 102, and the respective capture mode is selected by controlling the corresponding light-sensitive elements 303.

An image can also be captured in each instance with the different configurations of contrast shields 301. Combining the two recordings is helpful for a liveness detection method because fakes make contact with the surface in a different way than a living finger 101, for example. For instance, when fingerprints printed on paper or foil are placed on the placement surface 102, there is no optical coupling to the placement surface 102 (similar to when a document 105 is captured). Accordingly, as a result of the contrast shield 301 optimized for the fingerprint, no contrast-increasing remitted light 204 can be captured. This makes it appreciably more difficult to circumvent liveness detection (known as spoofing) with a forgery by a fingerprint printed on paper or foil compared to the solutions described in the prior art in which chiefly the skin valleys 104 are detected.

In a preferred embodiment form of the contrast shield 301 for high-contrast capture of various objects, fingers 101 and documents 105, a defined passage for a small portion of the remitted light 204 from the air-cover layer 401 transition is provided so that this portion is detected by the light-sensitive elements 303. As can be seen in FIG. 5, this can be realized through a contrast shield 301 which has no protrusion distance 505 (not shown here—see FIG. 8B, for example) or only a minimal protrusion distance 505 relative to the active region 305 of the light-sensitive element 303.

In a particularly preferred embodiment form, the protrusion distance 501 of contrast shield 301 is optimized for high-contrast capture of skin areas and, at the same time, a hole 507 (shown in FIG. 9 [*l*], but not here) is incorporated into the contrast shield 301 over the active region 305 of the light-sensitive element 303, which additionally allows documents 105 to be captured. One advantage of this embodiment form is that the resolution of the document capture is high because only remitted light 204 impinging perpendicularly on the light-sensitive element 303 is detected. This prevents information from one point on the object being detected in a plurality of light-sensitive elements 303. Instead, the small-area opening in the contrast shield 301, shown only as hole 507 in FIG. 9(*l*) can also be a square or other equilateral polygons or slits, preferably in crossed position with respect to one another.

As has already been described, the diode diaphragm layer 405 defines the size and shape of the active region 305 of the light-sensitive element 303 in that the diode diaphragm 302 covers peripheral portions of the light-sensitive element 303.

A further configuration of the direct sensor with adaptations for capturing documents 105 is shown in FIG. 6 as a schematically abbreviated detail. Two light-sensitive elements 303 are shown. In contrast to FIG. 5, these two light-sensitive elements 303 do not have any diode diaphragm layer 405 and are therefore shaded by a completely overlapping contrast shield 301. In this case, the illumination of document 105 is provided by an illumination layer 409 emitting diffuse illumination light 201 which, through the air layer 408 in relation to substrate 407 in direction of the placement surface 102 of cover layer 401, undergoes a collimation and orientation to the extent that at least a total internal reflection at placement surface 102 is prevented. Illumination light 201 illuminates document 105 in the same manner as described referring to FIG. 5, and scattering occurs at the upper surface of the document 105. The scattered light 203 passes through the air gap 106 between document 105 and cover layer 401, enters cover layer 401 via placement surface 102 and, owing to air gap 106, is blocked for the most part by contrast shield 301 as remitted light 204 with a limit angle 205 of approximately 41° in the layer sequence. Owing to a minimal protrusion distance 505 of contrast shield 301 relative to the unrestricted light-sensitive element 303 (i.e., with large-area active region 305 of light-sensitive element 303), only those scattered light components which are incident virtually parallel to the perpendicular 208 of placement surface 102 are blocked, and all obliquely incident remitted light 204 can be captured pixel by pixel for capturing the document 105 through sensor layer 406.

In this example, the active region 305 is exactly the same size as the light-sensitive element 303. In a preferred embodiment form—see FIG. 6—the contrast shield 301 shades the light sensitive element 303 in such a way that light which is remitted into the layer sequence orthogonal to the placement surface 102 is no longer detected so that documents 105 as well as skin prints can be captured.

A contrast shield 301 with a smaller surface area would lead to a worsening of the contrast between skin ridges 103 and skin valleys 104 for the reasons described in the foregoing. A contrast shield 301 with a larger surface area with a defined protrusion distance 501 relative to the active region 305 is also not recommended in this case because the passage areas 304 of the sensor layer 406 are overlapped in this way by the nontransparent contrast shield 301 and the light path of illumination light 201 is partially blocked en route to the placement surface 102.

Figure 7A:
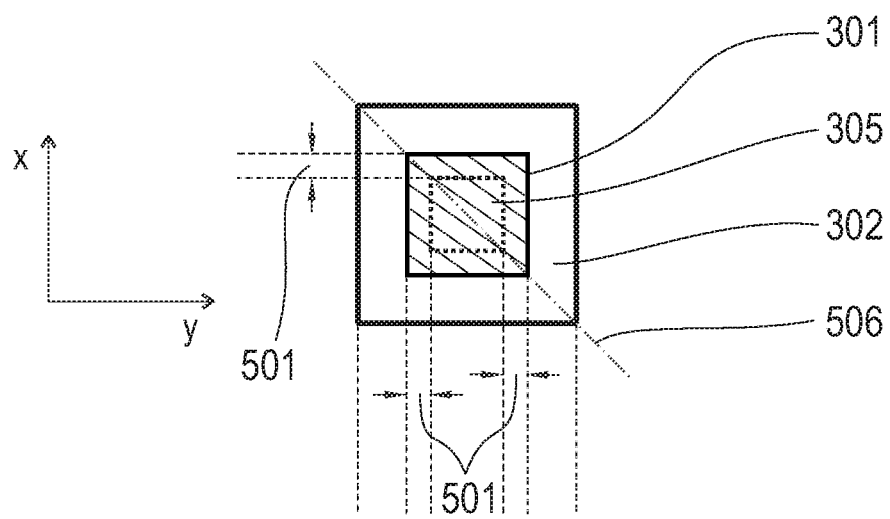
FIG. 7A a top view of a first embodiment form of a light-sensitive element with diode diaphragm and contrast shield.
Figure 7B:
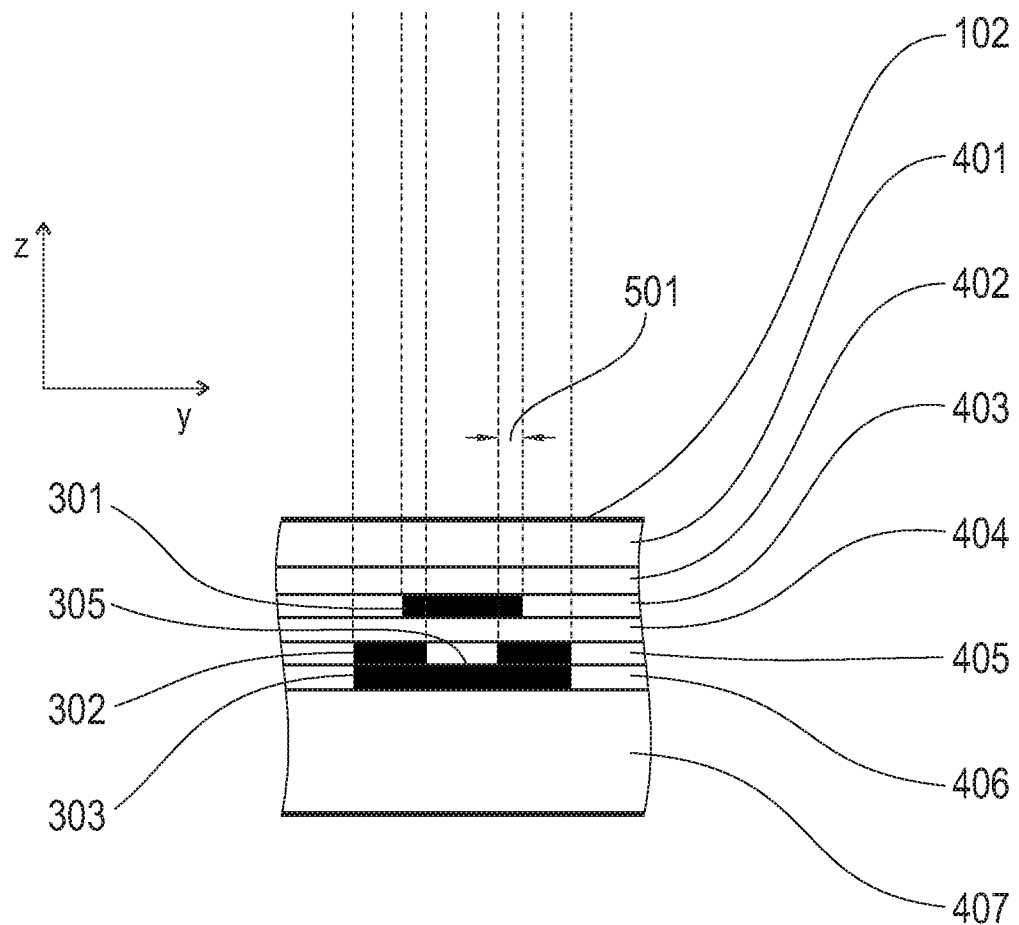

An embodiment form of diode diaphragm 302, active region 305 and contrast shield 301 for contrast-enhanced capture of skin prints is shown schematically in top view in FIG. 7A. The associated top view of active region 305 is shown by a dashed line in FIG. 7A. Contrast shield 301 and diode diaphragm 302 are represented by solid lines, and contrast shield 301 has hatching in addition. Insofar as the arrangement of contrast shield 301 and diode diaphragm 302 and active region 305 have symmetry, corresponding symmetry axes 506 are shown. A possible symmetry axis 506 of the depicted arrangement is shown by way of example in FIG. 7A as a dash-dot line. The arrangement can be described clearly in the top view via the x-y plane. The layer sequence in FIG. 7A is described by the y-z plane and is shown as side view in a section through the y-z plane in FIG. 7B taking as basis the remarks referring to FIG. 1. FIG. 7B shows additional adhesive layer 402 with which the optical coupling of cover layer 401 is carried out through adapted refractive index transitions to the layer sequence of the apparatus lying below it.

Further advantageous particularly preferred embodiment forms of the contrast shield 301 and active region 305 are shown and described in the following. The layer sequence conforms to one of the configurations described referring to FIG. 1, FIGS. 2A, 2B, FIG. 3, FIG. 5, FIG. 6 or FIG. 7A so that side views are omitted in the following figures. The embodiment forms in FIG. 8A to FIG. 8D and in FIG. 9 (*a*) to (*o*) are shown in top view and, with the aid of the dashed lines and solid lines, define the unique association between the active region 305, limited by diode diaphragm 302, and the contrast shield 301. The embodiment forms differ with respect to symmetry, orientation of the contrast shield 301 and active region 305 relative to one another, geometric surface area shapes, surface area sizes and additional structuring.

Four embodiment forms of the contrast shield 301 and active region 305 are shown schematically in FIGS. 8A-D in the top view of a light-sensitive element 303 of the direct optical sensor. Diode diaphragm 302 and contrast shield 301 are shown in solid lines, active region 305 is shown with a dashed line, and symmetry axes 506 are shown in dash-dot lines in all of the embodiment forms. Contrast shield 301, which also has hatching, has at least the same surface area size as active region 305 and, at a maximum, the same surface area size as diode diaphragm 302 or light-sensitive element 303 in all of the embodiment forms.

Figure 8A:
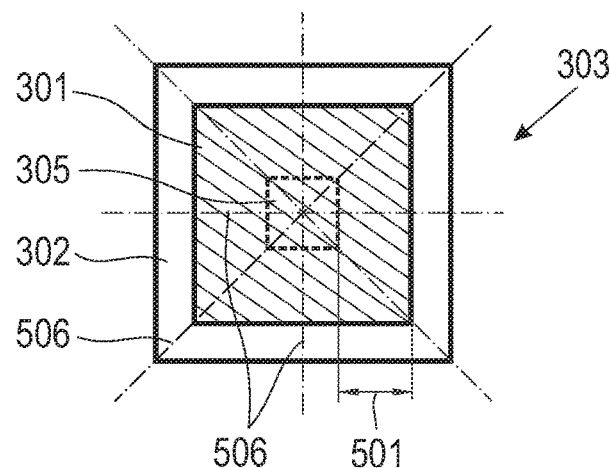
FIG. 8A a top view of the light-sensitive element analogous to FIG. 7a using a square contrast shield with a defined symmetrical protrusion distance relative to an active region which is left open by the diode diaphragm.

FIG. 8A shows a square contrast shield 301 and a square active region 305. The surface area shapes are identical geometrically. Moreover, the surface areas are arranged in parallel with the same orientation according to a central projection; that is, the contrast shield 301 is situated symmetrically above the active region 305. The protrusion distance 501 of contrast shield 301 is larger than in FIG. 1 and is of equal size in both dimensions of the pixel raster (x dimension and y dimension). This means that the contrast shield 301 has a protrusion distance 501 of the same size at each of the four sides of the square active region 305. Further, the embodiment form in FIG. 8A has four symmetry axes 506 at which there is a mirror reflection of the arrangement.

Figure 8B:
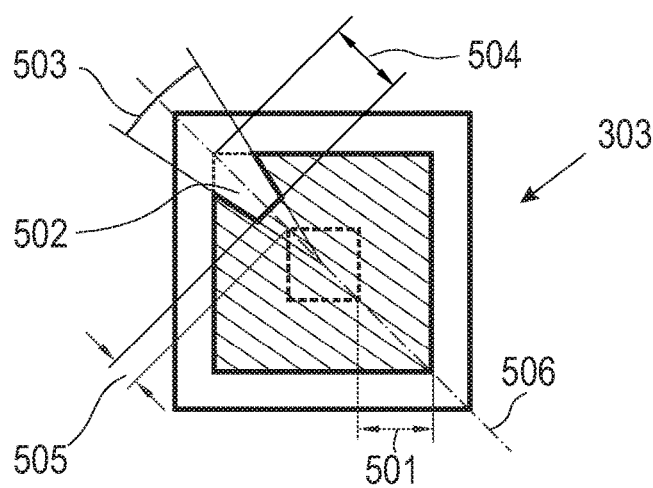
FIG. 8B a top view of the light-sensitive element in a second embodiment form of a square contrast shield in which the protrusion distance is reduced in one direction by a recess.

In FIG. 8B, contrast shield 301 and active region 305 also have a geometrically similar surface area shape. Geometrically similar surface area shapes are, for example, a square and a rectangle or a circle and ellipse. In FIG. 8B, the contrast shield 301 further has a removed sector in the shape of a notch 502. The notch 502 is defined by the notch angle 503 and the notch depth 504, which results in a reduced minimum protrusion distance 505 of the contrast shield 301 relative to active region 305 at the position of the notch 502.

Figure 8C:
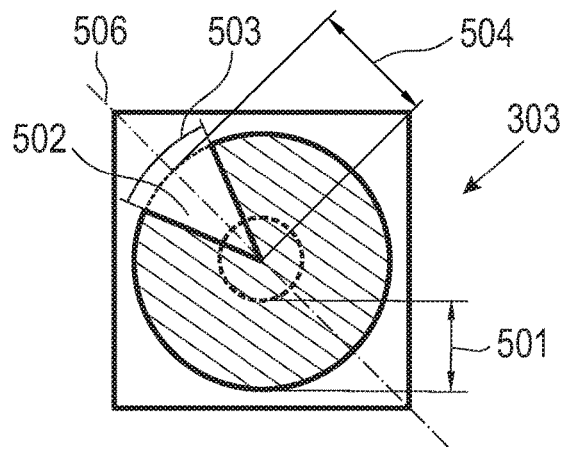
FIG. 8C a top view of the light-sensitive element in a third embodiment form of a circular contrast shield over a circular active region in which the uniform protrusion distance is interrupted in one direction by a sector-shaped recess and the active region is not completely covered.

FIG. 8C shows a round contrast shield 301 with a removed sector in the shape of a notch 502 and an active region 305 with a circular surface area. In this arrangement, because of the circular shape, the protrusion distance 501 is the same size at every point except that of the removed sector. As in FIG. 8B, the notch 502 is defined by the notch angle 503 and the notch depth 504 which can be optionally selected in producing an embodiment form of this type. In this case, there is no longer a minimum protrusion distance 505 at the position of the notch 502; rather, a portion of the active region 305 is left exposed (not covered) so that remitted light 204 can also impinge perpendicularly in this region and can be used to capture documents 105 as security-relevant objects.

Figure 8D:
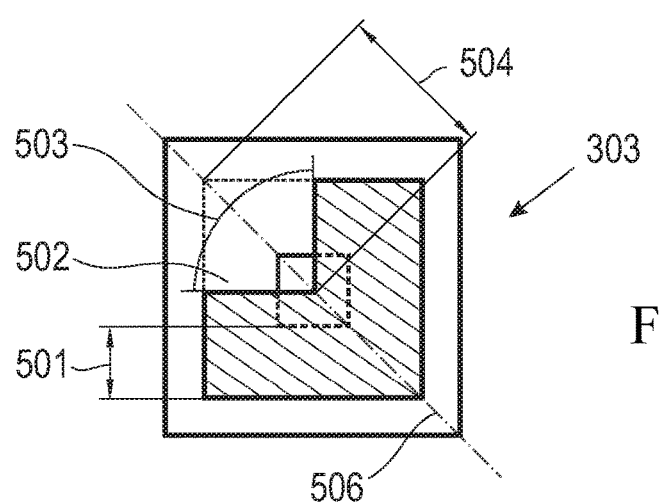
FIG. 8D a top view of the light-sensitive element in a fourth embodiment form of a square contrast shield over a square active region in which the uniform protrusion distance for two orthogonal directions is interrupted by a rectangular sector-shaped recess and approximately 25% of the active region is not covered.

In FIG. 8B as well as in FIGS. 8C and 8D, the arrangement has only one symmetry axis 506 with reference to the notch 502.

FIG. 8D shows a further embodiment form of the invention which represents a modification over FIG. 8B and FIG. 8C. In this case, the left-out sector is shown in a square contrast shield 301 over a square active region 305. As in FIG. 8C, notch 502 is removed up to active region 305 and eliminates the protrusion distance 501, which is otherwise uniform in all directions, such that the surface area of the contrast shield 301 and the surface area of the covering of active region 305 are reduced by one fourth. This arrangement of the light-sensitive element 303 viewed from direction of the placement surface 102 is chiefly suited for high-contrast captures of skin prints (e.g., fingers 101) as well as for capturing documents 105 in that approximately 75% of active region 305 is covered. The portion of remitted light 204 which impinges on the active region 305 orthogonal to placement surface 102 can accordingly be detected for capturing documents 105.

Figure 9:
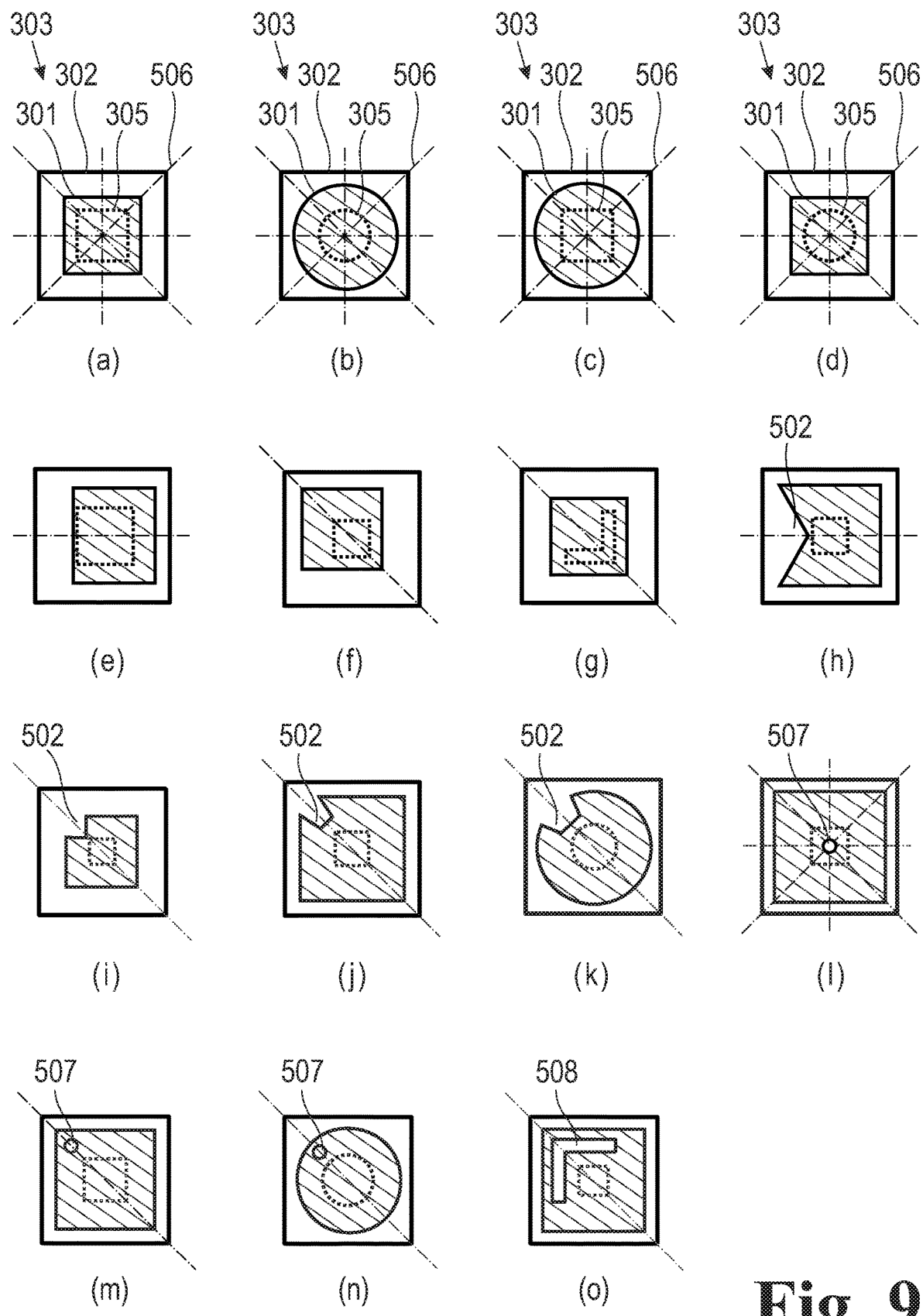
FIG. 9 top views of further preferred arrangements of the apparatus according to the invention with different configurations of the contrast shield and active region of the light-sensitive elements.

FIG. 9 (a) to (o) shows preferred embodiment forms for the configuration of contrast shields 301 and active region 305. They are shown only in top view because the layer sequence is the same as in FIG. 1. Contrast shield 301 and diode diaphragm 302 are shown in solid lines, active region 305 is shown with a dashed line, and symmetry axes 506 are shown in dash-dot lines in all of the embodiment forms. Contrast shield 301, which also has hatching, has at least the same surface area size as active region 305 and, at a maximum, the same surface area size as diode diaphragm 302 or light-sensitive element 303 in all of the embodiment forms.

FIG. 9 (a) shows the same embodiment form of contrast shield 301 that has already been shown in FIG. 8A and described above. The greater the selected protrusion distance 501 of contrast shield 301, the smaller the angular area of remitted light 204 that is detected in active region 305. Accordingly, a determined portion of the remitted light 204 is not detected, and the light 204 remitted from air into the layer sequence is blocked to a greater extent than light that is remitted from skin into the layer sequence. This appreciably improves the contrast between skin ridges 103 and skin valleys 104. In order to meet the stated object of the invention and optimize the contrast between skin ridges 103 and skin valleys 104, the protrusion distance 501 of contrast shield 301 in a particularly preferred embodiment form is increased until only remitted light 204 with angles greater than the limit angle 205 of the air-glass transition (approximately 41°) can be detected. The protrusion distance 501 required for this purpose is decisively dependent on the refractive index of cover layer 401 and on the thickness of the spacer layer 404. The refractive index of cover layer 401 defines the limit angle 205 or 206 of the remitted light 204. The smaller the thickness of spacer layer 404, the smaller the protrusion distance 501 required for blocking remitted light from 0° up to a determined limit angle 205 relative to perpendicular 208 of placement surface 102. For example, assuming the refractive index of cover layer 401 is n=1.517 (BK7 glass) and the thickness of spacer layer 404 is d=10 µm, a minimum protrusion distance 505 of 8.7 µm is necessary in order to block remitted light 204 with angles<41° to the perpendicular 208 of placement surface 102 and, therefore, in order not to detect light from skin valleys 104.

This is calculated from the following formula:

$$a = d \cdot \tan \alpha,$$

where a is the minimum protrusion distance 505 and $\alpha$ is the angle of the remitted light 204 to perpendicular 208 of placement surface 102.

To determine the minimum protrusion distance 505 for high-contrast capture of moist fingers 101, it is merely necessary to plug the limit angle of remitted light 204 from the water-to-cover layer 401 transition ($\alpha$=61°) into the formula described above. Under the same preconditions as the aforementioned (d=10 µm and n=1.517), a protrusion distance 501 of a=18 µm is required for limiting and not detecting the light paths of the light 204 remitted from water into the layer sequence from 0° to the corresponding limit angle of 61° to the perpendicular 208 of placement surface 102.

An advantage of direct optical sensors consists in that both skin prints (e.g., of fingers 101) and documents 105 can be captured. Since a document 105 does not undergo optical coupling with the placement surface 102 when placed thereon and an air gap 106 is usually located between document 105 and placement surface 102, the remitted light 204 of a document 105 has a limit angle 205 of approximately 41°. If the active region 305 can no longer detect remitted light 204 from the air-glass transition owing to contrast shield 301, documents 105 cannot be captured by a direct sensor of this kind. Consequently, it is helpful to select the configuration of the contrast shield 301 in such a way that at least some of the remitted light 204 from the air-glass transition can be detected so that documents 105 such as passports, driver's licenses, visiting cards, etc. can still be captured.

This shows that the specific case of application defines the actual configuration of the contrast shield 301 in order, for example, to enable the capture of various security-relevant objects, including documents 105, to efficiently organize imaging processes with regard to the required light intensity of the illumination light 201, or to optimize the contrast for capturing a particular object. For example, if the protrusion distance 501 of contrast shield 301 from FIG. 9 (a) is selected such that the limit angle 206 of the skin-glass transition (approximately 65°) can just barely be detected, the contrast during the capture of skin prints is still very good but the total detectable light intensity for each light-sensitive element 303 is very sharply reduced. Consequently, in order to compensate for the loss of light intensity and to improve the signal-to-noise ratio the light intensity of the illumination light 201 must be increased. However, it is precisely in the domain of mobile applications that an efficient, energy-saving configuration of the apparatus is advantageous, for example, so as to increase the battery life of a device with the apparatus according to the invention.

Further embodiment forms of contrast shield 301 and active regions 305 are shown schematically in FIG. 9 (b), (c), (d). FIG. 9 (b), (c), (d) shows embodiment examples in which round (preferably circular) surface areas are used for both contrast shield 301 and active region 305, but square or the like surface area shapes of contrast shield 301 are also combined with round (circular) surface areas of active region 305, or vice versa, as is shown in FIG. 9 (c) and (d).

FIG. 9 (b) shows a particularly preferred embodiment form in which the active region 305 and the contrast shield 301 are both round and the protrusion distance 501 is accordingly parallel to sensor layer 406 in all directions and, therefore, the blocking of light is equal for all directions.

In mobile applications (e.g., use in cell phones, tablets, etc.), there is additionally a need for sufficiently thick cover layers 401 because they guarantee an improved mechanical and chemical protection of the direct sensor. However, information from an object point is detected in a plurality of light-sensitive elements 303 simultaneously when the distance between sensor layer 406 and placement surface 102 is increased, for example, through a thicker cover layer 401. This results in reduced contrast and lower resolution. Since preferably light 204 remitted from skin ridges 103 is detected in the solution according to the invention, i.e., light from the differential angle 207 between limit angle 205 of the air-to-cover layer transition (41° for BK7) and limit angle 206 of the skin-to-cover layer transition (65° for BK7), the same object information impinges on at least two light-sensitive elements 303 proceeding from an object-to-sensor distance of less than 25 µm.

As the result of a preferred embodiment form of contrast shield 301 as is shown in FIG. 9 (*e*), a high contrast and a high resolution are achieved simultaneously by increasing the thickness of cover layer 401. In this instance, contrast shield 301 is arranged in such a way that only a portion of the light cone of the scattered light 203 generated by the skin is detected in the active region 305 of the light-sensitive element 303 as remitted light 204. To this end, contrast shield 301 is arranged as a rectangle asymmetrically over active region 305. Contrast shield 301 has in three directions a protrusion distance 501 of an extent such that the light 204 (not shown here) remitted by finger 101 which would impinge on the active region 305 from three directions is completely blocked and, in a fourth direction of the pixel raster, exhibits a minimum protrusion distance 505 (which can also approach zero) so that only obliquely incident light from the fourth direction can pass the contrast shield 301 at a minimum protrusion distance 505 and is detected in the active region 305 of light-sensitive element 303.

As has already been described, it is also the case in this instance that the more light paths that are limited in favor of a good contrast and a good resolution, the higher the light intensity of illumination light 201 must be in order to achieve a good signal-to-noise ratio. For this reason, it may be advantageous if the contrast shield 301 has only a minimum protrusion distance 505, if any, in one direction as is illustrated in FIG. 9 (*e*).

FIG. 9 (*f*) shows a preferred embodiment form in which contrast shield 301 has a large protrusion distance 501 only in two directions of the pixel raster which are offset by 90° so that light from there can no longer reach active region 305. In the two other directions, contrast shield 301 has a minimum protrusion distance 505 which can approach zero. The advantage of this embodiment form is that the resolution or CTF (Contrast Transfer Function) is improved to an equal extent in vertical direction and in horizontal direction.

FIG. 9 (*g*) shows a configuration in which the shape and surface area of active region 305 defines the protrusion distance 501 of contrast shield 301. Active region 305 has been reduced to a determined surface area by which remitted light 204 can still impinge at every point on this surface area. By reducing the surface area of active region 305, the detection of interfering scattered light 203 propagating between diode diaphragm 302 and contrast shield 301 is reduced. This results in a further improvement in contrast.

In principle, contrast shield 301 and active region 305 can have any shape and need not necessarily be a square, rectangle or circle. Further preferred variants of the arrangement of contrast shields 301 are illustrated in FIG. 9 (*h*), (*i*), (*j*), (*k*) and show that the contrast shields 301 can also have recesses in the form of notches 502 (gaps, slits or the like).

FIG. 9 (*h*) shows an embodiment form in which the contrast shield 301 is so configured that it has a large protrusion distance 501 in three directions offset by 90° within the contrast enhancing layer 403 and a minimum protrusion distance 505 in the fourth direction which is described by a notch 502 with a defined notch angle 503 and a defined notch depth 504. The smaller the notch angle 503, the greater the improvement in resolution because a smaller angular area of the remitted light 204 is detected. The greater the notch depth 504 or the smaller the minimum protrusion distance 505, the greater the detected light intensity; however, the contrast between skin ridges 103 and skin valleys 104 is also worsened because scattered light 203 from the touching skin areas (skin valleys 104) with air gap 106 are captured in addition.

FIG. 9 (*i*), (*j*), (*k*) show particularly preferred embodiment forms with square and round surface area shapes, respectively, in which contrast shield 301 has a notch 502 over a corner of the light-sensitive element 303. The advantage of these embodiment forms consists in that the resolution is uniformly improved in two dimension (x dimension and y dimension of the pixel raster), since the symmetry axis 506 of the arrangement extends by precisely 45° in the x-y plane of the pixel raster. Resolution and contrast can be considerably improved in embodiment forms of this type. In a simplified configuration shown in FIG. 9 (*k*), the recess describes a wedge-shaped surface area as has already been shown in FIG. 8*c* as a geometrically complete circle sector. In FIG. 9 (*k*), the notch 502 does not extend over the active region 305 so that a minimum protrusion distance 505 (not shown here) of contrast shield 301 remains and the active region 305 is completely covered. The wedge-shaped recess is then described by a notch depth 504 (only shown in FIGS. 8B-8D) which approximately corresponds to one half of the radius of the contrast shield 301 in FIG. 9 (*k*). One advantage of a construction of this type consists in the simple geometry and improved contrast in skin captures, while the arrangement of the notch 502 according to FIG. 8C with a notch depth 504 which opens a part of the covering of active region 305 allows high-contrast imaging of fingers 101 as well as of documents 105.

FIG. 9 (*l*) shows a contrast shield 301 with a hole 507 over the active region 305. As has already been described, the contrast shield 301 can have recesses, for example, holes 507 or slits 508, so as to enable detection of portions of remitted light 204 from the air-to-cover layer 401 transition and to allow documents 105 to be captured with good resolution. The position at which contrast shield 301 has a local recess above the active region 305 is optional. This local recess serves primarily for high-resolution, high-contrast capture of documents 105 without substantially impairing the contrast of a skin area of a finger 101 captured with the same configuration. Of course, the embodiment form in FIG. 9 (*l*) can also be combined with the embodiment forms of contrast shields 301 which have already been described.

Further, a recess in contrast shield 301, for example, a slit 508 or a hole 507, can be utilized in other configurations for homogenizing the illumination of the active regions 305 of light-sensitive elements 303 as shown in FIG. 9 (*m*), (*n*), (*o*).

When producing apertures, for example, through photolithography processes, manufacturing tolerances may occur so that the positioning between contrast shields 301 and active region 305 is liable to fluctuate. In order to compensate for resulting non-uniformities in sensitivities between the pixels 307, there is advisably a large distance between contrast shield 301 and active region 305 by means of a thick spacer layer 404. Therefore, the spacer layer 404 has a preferred thickness of between 0.5 µm and 50 µm, the thickness particularly preferably lies in the range of from 1 µm to 10 µm as has already been mentioned. However, longer processing times must be budgeted for with a thick spacer layer 404, which can make this approach expensive.

Additional steps for compensation of position inaccuracies of the aperture layers, contrast enhancing layer 403 and diode diaphragm layer 405, stemming from the manufacturing process are shown in FIGS. 9 (m), (n), (o) and result in an improved robustness vis-à-vis positional deviations in the layers. These arrangements have recesses as hole 507 or slit 508 which—in contrast to FIG. 9 (l)—are not located above the active region 305. Accordingly, active region 305 only detects light that impinges obliquely through the recesses of contrast shield 301. A first minimum angle and a second maximum angle of the remitted light 204 between which remitted light 204 can be detected in the active region 305 are defined through the arrangement of contrast shields 301. The removed area of contrast shield 301 is preferably formed such that only remitted light 204 with angles between 60° and 35°, and particularly preferably between 55° and 51°, relative to the perpendicular 208 of support surface 102 is detected. This renders the sensitivity of the light-sensitive elements 303 more uniform in the presence of manufacturing inaccuracies. As has already been described, this can also be implemented with different geometric surface area shapes of contrast shield aperture 301, of active region 305 and of the removed portion of contrast shield 301.

Contrast shields 301 shown in FIG. 9 (m), (n) to a slight extent allow additional incident angles from which light can be detected and limit these additional incident angles to a narrow range along the symmetry axis 506 shown in the drawing so that an additional contrast-enhancing and resolution-increasing effect can be achieved for document 105.

It will be apparent to those skilled in the art that there exist aside from the embodiment forms described above other possible arrangements for meeting the stated object of the invention. Optional combination of the various arrangements allows the apparatus to be optimized for certain application scenarios not described herein.

In order to achieve a contrast-enhancing effect when capturing skin prints, at least 60% of the active region 305 of light sensitive element 303—viewed from direction of placement surface 102—must be covered by the respective associated contrast shield 301. For a significant improvement in contrast when capturing skin prints, this covering must be at least 75%, preferably 90%. With complete coverage (100%), the contrast when capturing skin prints is further improved, while the capture of documents 105 with sufficient quality is still possible. When there is a protrusion distance 501 of the contrast shield 31 with respect to active region 305, the contrast of skin prints is optimized, but documents 105 can no longer be captured with sufficient quality without further measures (at least singular recesses).

FIG. 10 schematically shows the apparatus according to the invention fully integrated into a mobile device in side view and top view. A mobile device can be, for example, a cell phone 308 or a tablet in which—in addition to an electronics layer 410 with the usual electronic components (e.g., WLAN, battery, RFID, USB, CPU etc.)—the apparatus according to the invention is integrated. In this way, the upper side of the cell phone 308 terminates with the cover layer 401 of the apparatus according to the invention, and objects such as one or more fingers 101 and/or a document 105, for example, which are placed on the placement surface 102 provided on this upper side can be captured with high quality, i.e., with good contrast (>50%) and high resolution (≥500 ppi). For high-quality captures, the corresponding embodiment forms of the contrast shield 301 which have already been described are used in combination with suitably configured active regions 305 of light-sensitive elements 303.

The integration of the direct optical sensor with the layer sequence already described referring to the preceding figures takes place on areas of the display surface (display) of the mobile device and particularly preferably on the entire display surface. For this purpose, the display for displaying user information and for emitting illumination light 201 is located below the layer sequence of the direct optical sensor. In a particularly preferred manner, the display is realized in the form of point light sources 306 which are integrated in the sensor layer 406 between the light-sensitive elements 303. In this respect, all of the remarks referring to FIG. 2A, FIG. 2B and FIG. 5 are applicable and fitting. Owing to the smaller thickness of the layer sequence of the direct optical sensor which can be realized with this constructional variant, the cell phone 308 selected as an exemplary representative of any mobile device can also be carried out in a generally flat construction.

LIST OF REFERENCE NUMERALS 101 finger
102 placement surface
103 skin ridge (papillary ridge)
104 skin valley (papillary furrow)
105 document
106 air gap (in skin valley, under document)
201 illumination light
202 scattered light
203 light scattered in direction of the placement surface
204 (remitted) light
205 limit angle (air-to-cover layer)
206 limit angle (skin-to-cover layer)
207 differential angular area
208 perpendicular to placement surface
301 contrast shield
302 diode diaphragm
303 light-sensitive element
304 passage area
305 active region
306 point light source
307 pixel
308 cell phone
401 cover layer
402 adhesive layer
403 contrast enhancing layer
404 spacer layer
405 diode diaphragm layer
406 sensor layer
407 substrate
408 air layer
409 illumination layer
410 electronics layer
411 (full surface-area) spectral filter layer
412 (structured) spectral filter layer
501 protrusion distance
502 notch
503 notch angle
504 notch depth
505 minimum protrusion distance
506 symmetry axis
507 hole
508 slit

What is claimed is:

1. An apparatus for direct optical capture of security-relevant objects, the apparatus comprising:
a cover layer with a placement surface for a security-relevant object;
a contrast enhancing layer with transparent areas and nontransparent contrast shields for limiting incident angles of light remitted by the object through the placement surface into a layer sequence and for predominately passing light remitted by portions of the object placed on the placement surface without an air gap;
a sensor layer with pixels arranged in a two-dimensional pixel raster, wherein each pixel has a light-sensitive element and a transparent passage area, and wherein the light-sensitive element detects light coming only from a direction of the placement surface;
a substrate serving as a support for the layer sequence; and
an illumination layer for emitting illumination light which illuminates the object through the placement surface, the illumination layer having a plurality of point light sources which serve to emit in the direction of the placement surface in an angular area which is limited in such a way that a total internal reflection is suppressed at the placement surface of the cover layer; wherein
each light-sensitive element of the sensor layer has an associated nontransparent contrast shield within the contrast enhancing layer;
the associated nontransparent contrast shield is arranged at a distance above the light-sensitive element and has a surface area at least as large as an active region of the light-sensitive element to predominantly pass remitted light with large incidence angles to the light-sensitive element; and
the associated nontransparent contrast shield is arranged at a distance above the light-sensitive element such that the contrast shield centrally covers at least 60% of the active region of the light-sensitive element when viewed from the direction of the placement surface.

2. The apparatus according to claim 1, wherein the associated nontransparent contrast shield is arranged above the light-sensitive element in such a way that the contrast shield centrally covers at least 75% of the active region of the light-sensitive element when viewed from the direction of the placement surface.

3. The apparatus according to claim 1, wherein the associated nontransparent contrast shield is arranged above the light-sensitive element in such a way that the active region of the light-sensitive element is completely covered by the contrast shield when viewed from direction of the placement surface.

4. The apparatus according to claim 1, wherein the cover layer is formed as a transparent substrate for the layer sequence.

5. The apparatus according to claim 1, wherein the associated nontransparent contrast shield is formed above the light-sensitive element in such a way that the associated nontransparent contrast shield has a protrusion distance relative to the active region in at least two directions of the pixel raster, the at least two directions being offset by 90°.

6. The apparatus according to claim 1, wherein the associated nontransparent contrast shield has a geometrically similar surface area parallel to the active region of the light-sensitive element with identical orientation according to a central projection.

7. The apparatus according to claim 1, wherein the associated nontransparent contrast shield and the active region of the light-sensitive element have differently shaped parallel geometric surface areas.

8. The apparatus according to claim 1, wherein the surface area of the associated nontransparent contrast shield has a protrusion distance relative to the active region of the light-sensitive element, the protrusion distance having a magnitude determined as a function of a refractive index of the cover layer, a distance of the associated nontransparent contrast shield above the light-sensitive element and a shape of the associated nontransparent contrast shield and of the active region of the light-sensitive element.

9. The apparatus according to claim 1, wherein the contrast enhancing layer has two or more different nontransparent contrast shields alternating with one another and offset relative to one another in a raster corresponding to the pixel raster over active regions of the light-sensitive elements wherein different capture modes for capturing different security-relevant objects can be controlled.

10. The apparatus according to claim 5, wherein the associated nontransparent contrast shield has an equal magnitude of the protrusion distance relative to the active region of the light-sensitive element in three directions offset by 90° within the contrast enhancing layer and a smaller protrusion distance in a fourth direction offset by 90°, wherein the smaller protrusion distance can approach zero.

11. The apparatus according to claim 5, wherein the associated nontransparent contrast shield has an equal magnitude of the protrusion distance relative to the active region of the light-sensitive element in two directions within the contrast enhancing layer, the two directions being offset by 90°, and a shorter protrusion distance in two other directions opposite to the two directions, wherein the shorter protrusion distance can approach zero.

12. The apparatus according to claim 1, wherein the distance of the associated nontransparent contrast shields from the light-sensitive elements is adjusted by means of an additional spacer layer with a selectable layer thickness.

13. The apparatus according to claim 12, wherein the distance of the associated nontransparent contrast shields above the light-sensitive elements is adjustable within a range of from 0.5 µm to 50 µm.

14. The apparatus according to claim 1, wherein the illumination layer is formed as a large-area backlight coupled to the layer sequence below the sensor layer with an intermediate layer or an air layer.

15. The apparatus according to claim 1, wherein the illumination layer is formed as point light sources which are singularly arranged in an offset manner within the sensor layer in passage areas of the pixels and outfitted with beam-limiting apertures.

16. The apparatus according to claim 1, further comprising the contrast enhancing layer formed for predominantly passing light remitted by portions of the object on the placement surface without an air gap and for an additional component of light remitted by portions of the object on the placement surface with the air gap, wherein the associated nontransparent contrast shield is arranged above the light-sensitive element such that the active region of the light-sensitive element is completely covered when viewed from direction of the placement surface, and wherein the associated nontransparent contrast shield has a recess within a surface area covering the active region so that a component of predominantly perpendicularly impinging light can be additionally received in the surface area of the recess.

17. The apparatus according to claim 16, wherein the recess in the associated nontransparent contrast shield has a shape of a circular hole, elongated hole, slot, notch, sector or cutout of another shape and is arranged inside the surface area of the associated nontransparent contrast shield, which covers the active region of the light-sensitive element.

18. The apparatus according to claim 16, wherein the recess in the associated nontransparent contrast shield has a shape of a circular hole, elongated hole, slot, notch, sector or a cutout of another shape and is arranged in a protrusion distance of the nontransparent contrast shield relative to the active region of the sensor element.

* * * * *